(12) United States Patent
Yaksich et al.

(10) Patent No.: US 7,008,151 B2
(45) Date of Patent: *Mar. 7, 2006

(54) POWER DRIVER HAVING GEARED TOOL HOLDER

(75) Inventors: Theodore G. Yaksich, Seneca, SC (US); William H. Aultman, Pickens, SC (US); Gary L. Young, Six Mile, SC (US)

(73) Assignee: Jacobs Chuck Manufacturing Company, Clemson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/837,970

(22) Filed: May 3, 2004

(65) Prior Publication Data

US 2004/0202518 A1 Oct. 14, 2004

Related U.S. Application Data

(63) Continuation of application No. 09/729,572, filed on Dec. 4, 2000, now Pat. No. 6,729,812, which is a continuation-in-part of application No. 09/455,223, filed on Dec. 6, 1999, now abandoned.

(60) Provisional application No. 60/226,631, filed on Aug. 21, 2000.

(51) Int. Cl.
  *B23B 45/00* (2006.01)
(52) U.S. Cl. .......................... 408/240; 279/62
(58) Field of Classification Search .............. 279/60, 279/61, 62, 64, 902; 408/124, 240
See application file for complete search history.

(56) References Cited

U.S. PATENT DOCUMENTS

| 282,015 | A | | 7/1883 | Todd | |
|---|---|---|---|---|---|
| 1,195,214 | A | | 8/1916 | Hapgood | |
| 1,764,291 | A | * | 6/1930 | Emrick | 279/60 |
| 1,775,993 | A | * | 9/1930 | Emrick | 279/60 |
| 2,550,871 | A | * | 5/1951 | Sharp | 279/60 |
| 3,783,955 | A | | 1/1974 | Gill | 173/50 |
| 3,861,693 | A | * | 1/1975 | Huber | 279/61 |
| 4,260,169 | A | * | 4/1981 | Hall | 279/62 |
| 4,292,571 | A | | 9/1981 | Cuneo | 318/17 |
| 4,390,311 | A | | 6/1983 | Kuhlmann | 409/232 |

(Continued)

FOREIGN PATENT DOCUMENTS

CN ZL 00209050.3 1/2001

(Continued)

OTHER PUBLICATIONS

United Kingdom Search Report of Jun. 14, 2001.

*Primary Examiner*—Daniel W. Howell
(74) *Attorney, Agent, or Firm*—Nelson Mullins Riley & Scarborough LLP

(57) ABSTRACT

A power driver includes a motor and a spindle having a distal end thereof opposite the motor. The distal end has an axial bore formed therein. A gear assembly is disposed operatively between the motor and the spindle so that the motor rotationally drives the spindle through the gear assembly. A grip is mounted in the spindle in communication with the axial bore. A driver is mounted about the spindle in operative communication with the grip so that activation of the driver in a closing direction moves the grip radially toward the axis and activation of the driver in an opening direction moves the grip radially away from the axis.

11 Claims, 16 Drawing Sheets

U.S. PATENT DOCUMENTS

| | | | | |
|---|---|---|---|---|
| 4,407,615 A | 10/1983 | Kuhlmann | | 408/239 |
| 4,626,152 A | 12/1986 | Palm | | 409/232 |
| 4,648,608 A * | 3/1987 | Smith | | 279/60 |
| 4,688,975 A | 8/1987 | Palm | | 409/232 |
| 4,710,071 A | 12/1987 | Koehler | | 408/133 |
| 4,799,833 A | 1/1989 | Pennison et al. | | 408/132 |
| 4,804,048 A | 2/1989 | Porth, Jr. | | 173/47 |
| 4,824,298 A | 4/1989 | Lippacher et al. | | 408/240 |
| 4,848,779 A | 7/1989 | Wheeler et al. | | 279/60 |
| 4,944,638 A | 7/1990 | Brohammer | | 408/59 |
| 4,962,681 A | 10/1990 | Yang | | 81/54 |
| 4,976,173 A | 12/1990 | Yang | | 81/54 |
| 5,011,341 A | 4/1991 | DeGroff | | 408/124 |
| 5,033,552 A | 7/1991 | Hu | | 173/163 |
| 5,149,230 A | 9/1992 | Nett | | 408/42 |
| 5,170,545 A | 12/1992 | Hubscher | | 29/26 A |
| 5,207,697 A * | 5/1993 | Carusillo et al. | | 606/167 |
| 5,346,453 A | 9/1994 | Rivera-Bottzeck | | 483/1 |
| 5,361,853 A | 11/1994 | Takamura et al. | | 173/217 |
| 5,437,465 A | 8/1995 | Vogele et al. | | 279/22 |
| 5,451,127 A | 9/1995 | Chung | | 408/20 |
| 5,595,251 A | 1/1997 | Cook, Jr. | | 173/178 |
| 5,624,000 A | 4/1997 | Miller | | 173/216 |
| 5,738,469 A | 4/1998 | Hsu | | 408/139 |
| 5,788,021 A | 8/1998 | Tsai | | 188/67 |
| 5,863,159 A | 1/1999 | Lasko | | 408/124 |
| 5,893,685 A | 4/1999 | Olson et al. | | 408/35 |
| 5,927,914 A | 7/1999 | Mack et al. | | 408/240 |
| 5,984,022 A | 11/1999 | Harman, Jr. et al. | | 173/176 |
| 5,988,653 A | 11/1999 | Kuo | | 279/62 |
| 5,988,957 A | 11/1999 | Wheeler | | 408/239 |
| 5,988,958 A | 11/1999 | Mack | | 408/240 |
| 6,007,277 A | 12/1999 | Olson et al. | | 408/35 |
| 6,045,303 A * | 4/2000 | Chung | | 408/124 |
| 6,047,971 A | 4/2000 | Harman, Jr. et al. | | 279/143 |
| 6,070,884 A | 6/2000 | Mack | | 279/62 |
| 6,102,632 A | 8/2000 | Potter et al. | | 408/124 |
| 6,170,579 B1 | 1/2001 | Wadge | | 173/216 |
| 6,176,322 B1 | 1/2001 | Wadge | | 173/217 |
| 6,206,107 B1 | 3/2001 | Wadge | | 173/217 |
| 6,241,260 B1 | 6/2001 | Judge et al. | | |
| 6,247,706 B1 | 6/2001 | Kuo | | 279/62 |
| 6,263,980 B1 | 7/2001 | Wadge | | 173/217 |
| 6,402,160 B1 * | 6/2002 | Grogan et al. | | 279/61 |
| 6,428,018 B1 * | 8/2002 | Aultman et al. | | 279/61 |
| 6,488,286 B1 * | 12/2002 | Yaksich | | 279/62 |
| 6,729,812 B1 * | 5/2004 | Yaksich et al. | | 408/240 |
| 2003/0143042 A1 * | 7/2003 | Doyle et al. | | 408/124 |

FOREIGN PATENT DOCUMENTS

| | | | |
|---|---|---|---|
| GB | 556523 | | 10/1943 |
| GB | 651588 | | 4/1951 |
| GB | 705764 | | 3/1954 |
| GB | 2065001 | * | 6/1981 |
| GB | 2065001 A | | 6/1981 |
| GB | 2123719 | | 2/1984 |

* cited by examiner

| FIG. 4 |
|---|
| FIG. 4C |
| FIG. 4B |
| FIG. 4A |

POWER DRIVER HAVING GEARED TOOL HOLDER

CLAIM OF PRIORITY

This is a continuation of application Ser. No. 09/729,572 filed Dec. 4, 2000, now U.S. Pat. No. 6,729,812, which is a continuation-in-part of application Ser. No. 09/455,223 filed Dec. 6, 1999, now abandoned, and claims the benefit of U.S. Provisional Application No. 60/226,631 filed Aug. 21, 2000. Each of these applications is incorporated by reference herein.

BACKGROUND OF THE INVENTION

The present invention relates generally to electric or pneumatic power drivers. More particularly, the present invention relates to a power driver having a chuck that is constructed within the driver spindle.

Electric and pneumatic tool drivers are well known. Although twist drills are the most common tools on such drivers, the tools may also comprise screw drivers, nut drivers, burrs, mounted grinding stones and other cutting or abrading tools. Since the tool shanks may be of varying diameter or of polygonal cross section, the device is usually provided with a chuck that is adjustable over a relatively wide range. The chuck may be attached to the driver spindle by a threaded or tapered bore.

A variety of chucks for both hand and power drivers have been developed in the art. In an oblique jawed chuck, a chuck body includes three passageways disposed approximately 120□ apart from each other. The passageways are configured so that their center lines meet at a point along the chuck axis that is typically forward of the chuck. The passageways constrain three jaws which are moveable in the passageways to grip a cylindrical or polygonal tool shank displaced approximately along the chuck's center axis. The chuck includes a nut that rotates about the chuck center and that engages threads on the jaws so that rotation of the nut moves the jaws in either direction within the passageways. The body is attached to the spindle of a driver and is configured so that rotation of the body in one direction with respect to the nut forces the jaws into gripping relationship with the tool shank, while rotation in the opposite direction releases the gripping relationship. The chuck may be operated by a chuck key, or the sleeve may be rotated by hand in a keyless configuration. An example of a keyless chuck is disclosed in U.S. Pat. No. 5,125,673 commonly assigned to the present Assignee and the entire disclosure of which is incorporated by reference herein. Various configurations of keyless chucks are known in the art and are desirable in a variety of applications.

SUMMARY OF THE INVENTION

The present invention recognizes and addresses the foregoing considerations, and others, of prior art constructions and methods.

Accordingly, it is an object of the present invention to provide an improved power driver.

It is also an object of the present invention to provide an improved chuck for use with a driver.

One or more of these and other objects are achieved by a power driver having a motor and a spindle. A distal end of the spindle opposite the motor has an axial bore formed therein. A gear assembly is disposed operatively between the motor and the spindle so that the motor rotationally drives the spindle through the gear assembly. A grip is mounted in the spindle in communication with the axial bore. A driver is mounted about the spindle in operative communication with the grip so that activation of the driver in a closing direction moves the grip radially toward the axis and activation of the driver in an opening direction moves the grip radially away from the driver.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
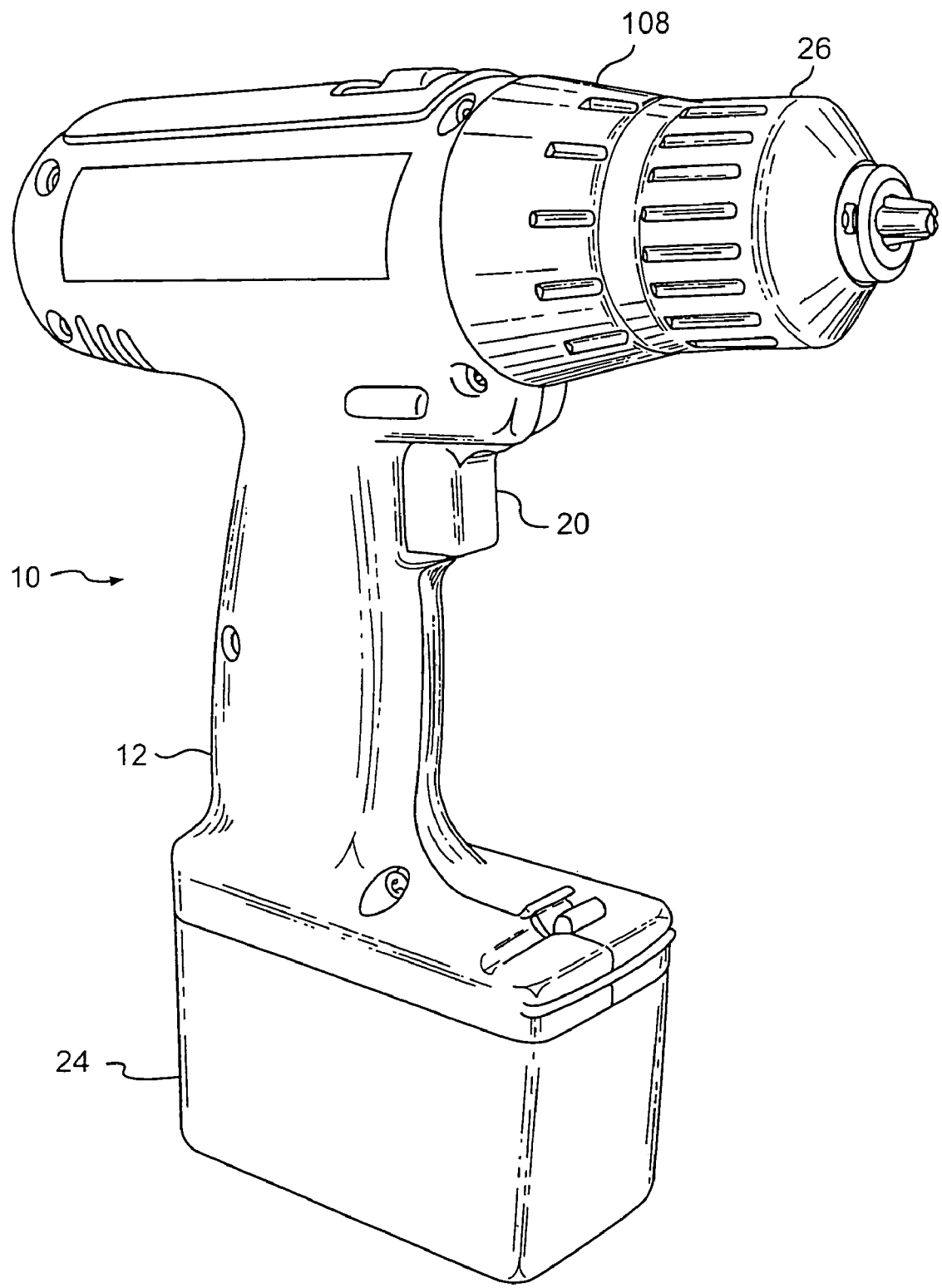
FIG. 1 is a perspective view of a power driver in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
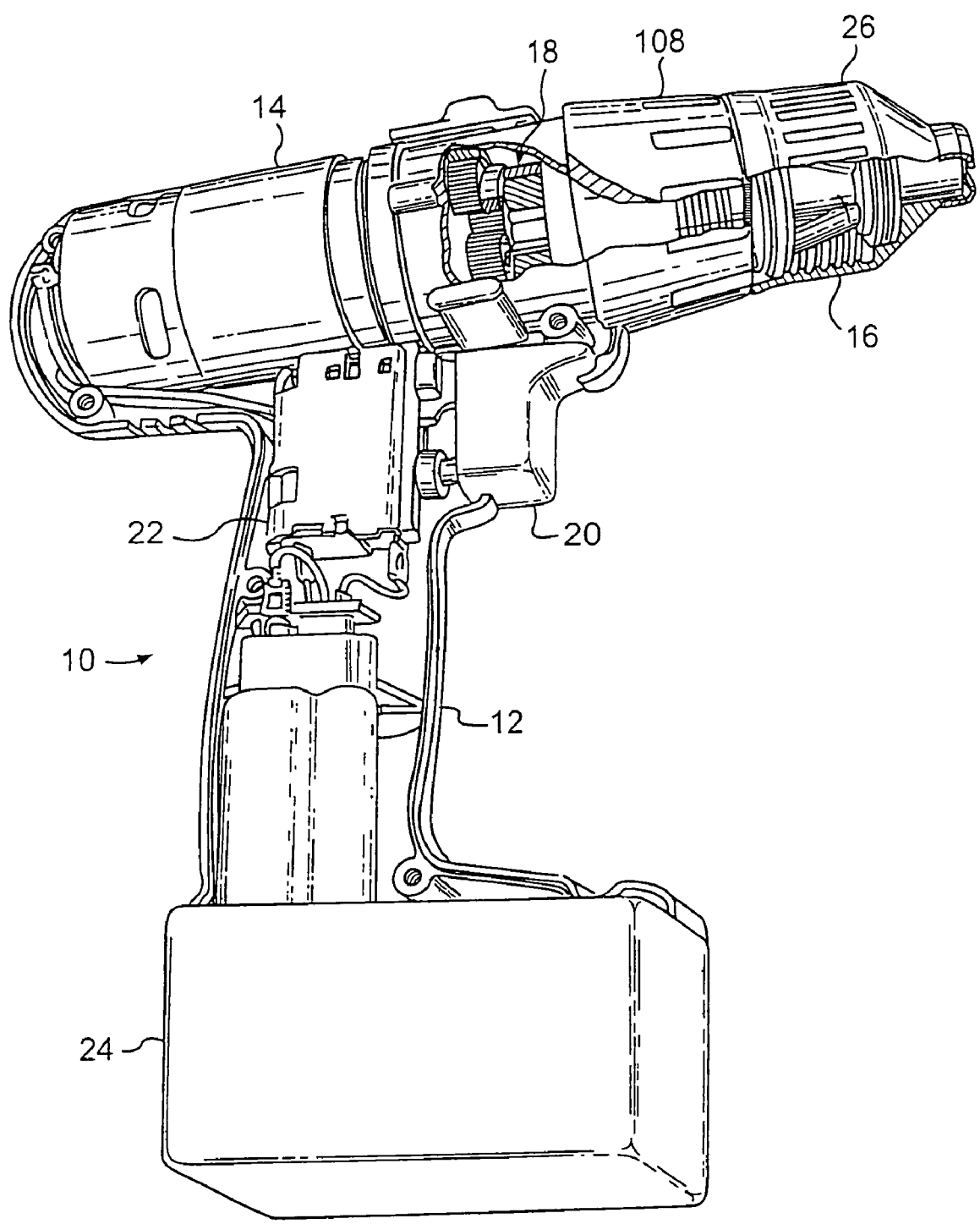
FIG. 2 is a cutaway view of the power driver as in FIG. 1.
Figure 3:
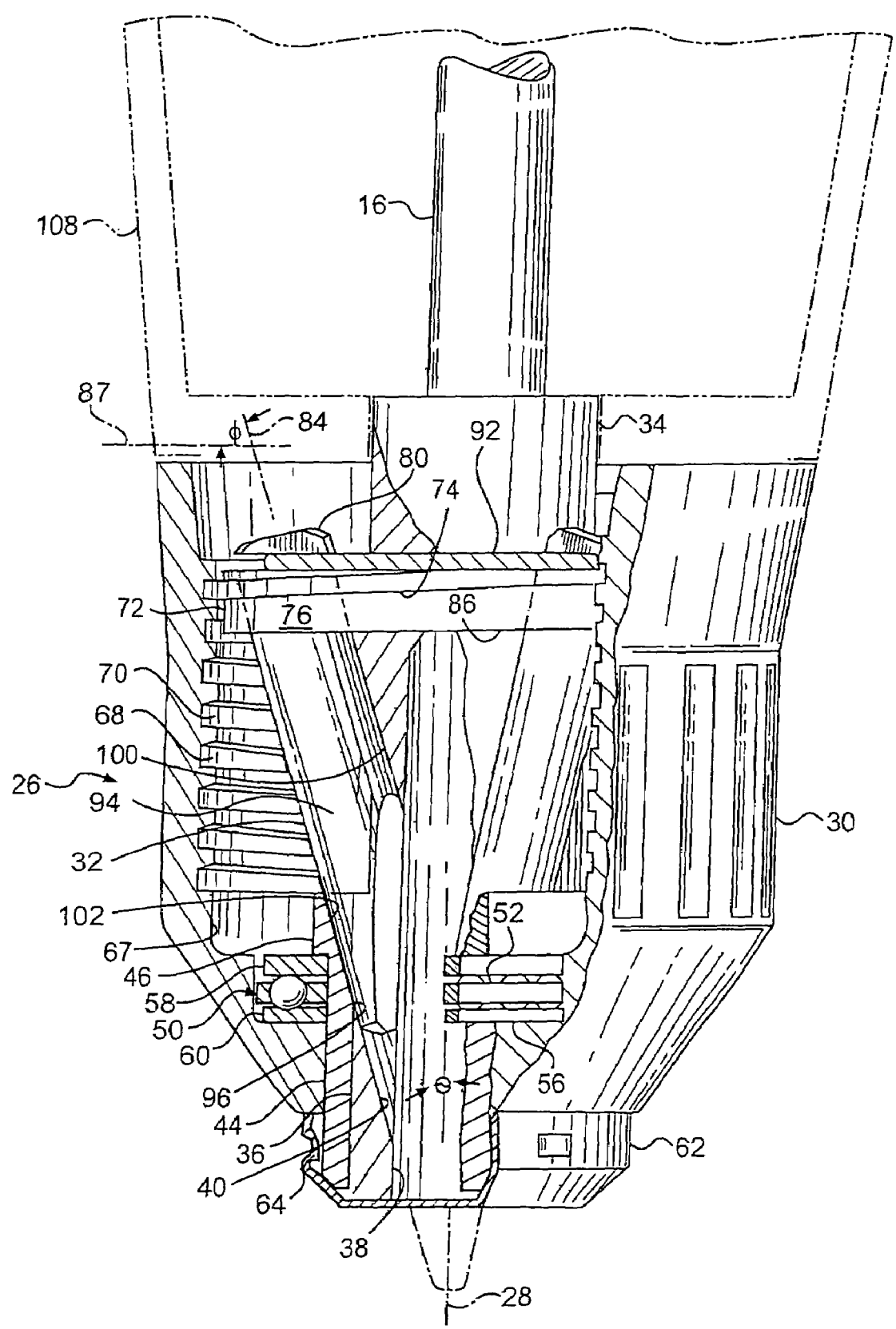
FIG. 3 is a sectional side view of the chuck shown in FIGS. 1 and 2.

Referring to FIGS. 1 and 2, a power driver 10 includes a housing 12 in which is disposed a motor 14 that rotationally drives a spindle 16 through a gear assembly 18. Motor 14 is activated by a trigger 20 that controls a switch assembly 22 to deliver power from a battery 24 to motor 14. Referring also to FIG. 3, the spindle is part of a chuck 26 that has a central longitudinal axis 28. The chuck includes a sleeve 30 and a plurality of jaws 32. Spindle 16 includes a generally cylindrical distal end 34 that is opposite motor 14 and that has a forward section 36. An axial bore 38 is formed in the forward section and is somewhat larger than the largest tool shank that the chuck is designed to accommodate. As should be understood in this art, spindle 16 may be formed from steel bar stock or any other suitable material.

Figure 4A:
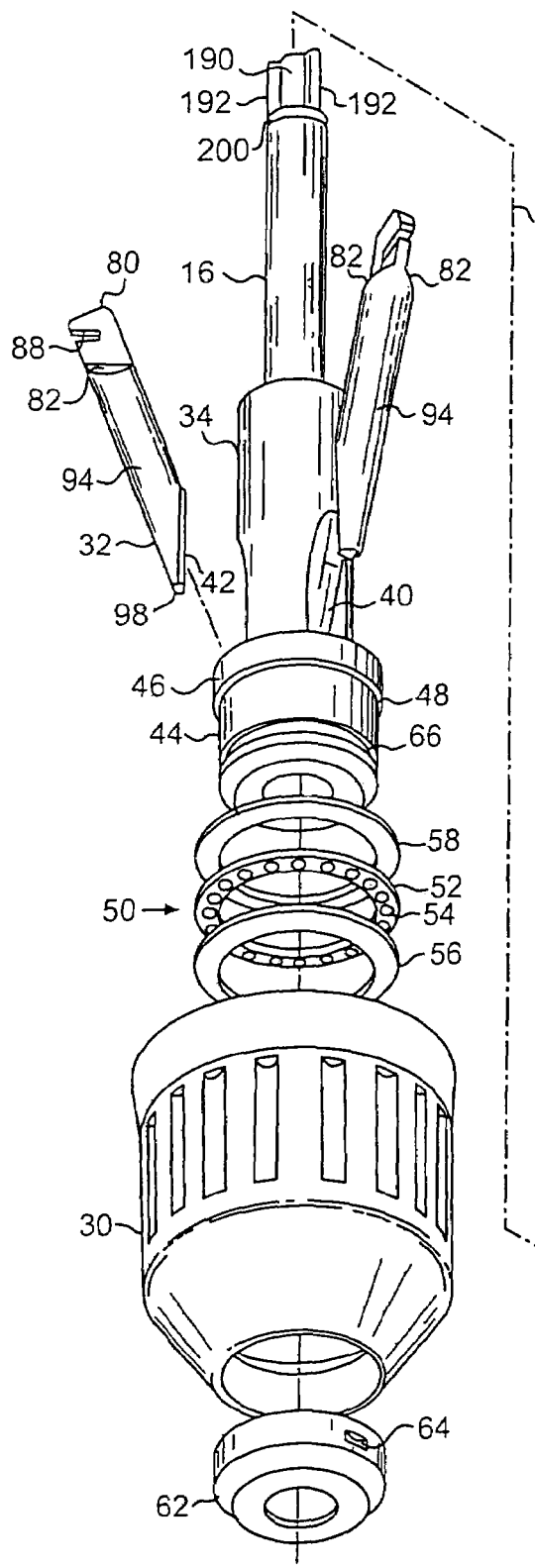
FIG. 4, which is presented as indicated in FIGS. 4A, 4B and 4C, is an exploded view of the chuck and gear box of the power driver shown in FIGS. 1 and 2.
Figure 4A:
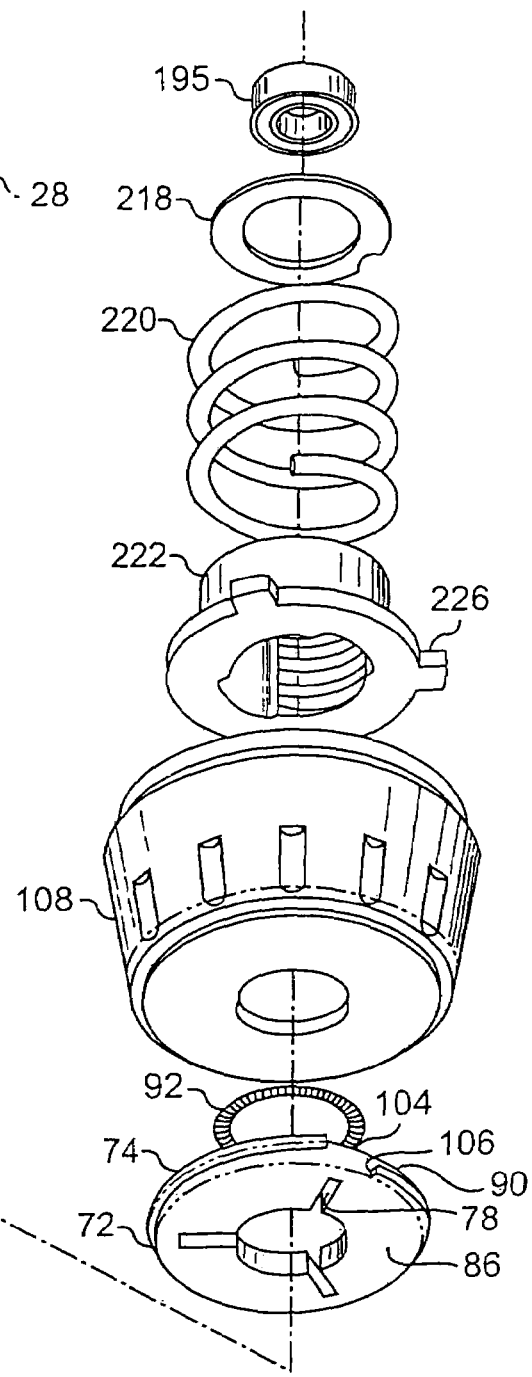

Referring to FIGS. 3 and 4A, distal end 34 defines three passageways 40 to respectively accommodate the three jaws. In a three-jaw configuration, each passageway, and therefore each jaw, is separated from each adjacent passageway by an arc of approximately 120□. The longitudinal axes of the passageways 40 and the jaws 32 are angled with respect to the chuck's longitudinal axis 28 and intersect the chuck axis at a common point. Each jaw 32 has a tool engaging face 42 that is generally parallel to axis 28.

A guide ring 44 is pressed onto forward spindle section 36 and, as discussed in more detail below, maintains alignment of jaws 32. The guide ring includes a thrust ring member 46 that defines a ledge 48 that receives a bearing assembly 50. The bearing assembly includes a bearing cage 52 enclosing bearing balls 54 that forwardly bear, with respect to distal end 34, on a forward washer 56 and rearwardly bear on a rearward washer 58 that abuts ledge portion 48. Forward race 56 bears in an axially forward direction against a shoulder 60 of sleeve 30. The bearing assembly may comprise any suitable construction, for example a bearing assembly of the type described in U.S. Pat. No. 5,348,318, incorporated herein by reference.

At the front end of the spindle, forward section 36 receives a nosepiece 62 for restraining sleeve 30 from forward axial movement with respect to the spindle. The nosepiece includes tabs 64 that are received in an annular groove 66 in guide ring 44 to retain the nosepiece in position. Alternatively, nosepiece 62 may be pressed onto guide ring 44 or attached in any other suitable manner. Furthermore, a snap ring or other suitable mechanism may be used to axially restrain the sleeve. Rearward axial movement of the sleeve on the spindle is prevented by thrust ring 46 through bearing assembly 50.

The outer circumferential surface of sleeve 30 may be knurled or may be provided with longitudinal ribs or other protrusions to enable the operator to grip it securely. The sleeve may be fabricated from a structural plastic such as polycarbonate, a filled polypropylene, for example glass filled polypropylene, or a blend of structural plastic materials. Other composite materials such as, for example, graphite filled polymerics could also be suitable in certain environments. Further, the sleeve may be constructed from suitable metals, such as steel. As would be appreciated by one skilled in the art, the materials from which the chuck is fabricated will depend on the end use of the power driver, and the above are provided by way of example only.

An interior surface 67 of sleeve 30 defines female threads 68. The threads are a modified square thread formation in an 8-pitch configuration along the length of sleeve 30. It should be understood, however, that any suitable thread shape or formation may be employed, for example including a modified buttress thread. In one preferred embodiment, the squared interface 70 between the outer surface and the back side of threads 68 is replaced by a curved surface.

A driver for opening and closing jaws 32 includes a driving disk nut 72 having a male thread 74 extending about the nut's outer circumferential surface 76. Thread 74 has the same pitch as threads 68 so that when thread 74 is received by threads 68, relative rotation between sleeve 30 and driving disk 72 moves the driving disk axially within the sleeve. In particular, where the driving disk is molded, thread 74 may have sloped sides, for example at an approximately 5□ slope, extending from surface 76 to the thread's outer diameter.

Driving disk 72 includes three equiangularly spaced apart slots 78 extending axially through the driving disk and receiving respective end sections 80 of jaws 32 therethrough. Each end section has a generally rectangular cross section that corresponds to the cross section of its slot 78 so that the slot slidably receives the jaw end section but prevents rotation of the jaw about the jaw's axis.

Each end section 80 meets the generally cylindrical main portion of the jaw at an interface that defines two shoulders 82 on respective sides of the end section. The shoulders are formed at an angle Φ between jaw axis 84 and a plane defined by shoulders 82 (indicated by parallel plane 87) so that when the jaws are received in passageways 40 of distal spindle end 34, the shoulders are flush against a flat front face 86 of driving disk 72. In one preferred embodiment, front face 86 is perpendicular to the chuck axis, and angle Φ is therefore equal to 90□ minus an angle Θ between jaw axis 84 and chuck axis 28.

Each end section 80 also defines a slot 88 extending generally radially into the end section parallel to the shoulders 82. The end sections extend through the slots 78 so that slots 88 are rearward of and parallel to a flat rear face 90 of driving disk 72. Each slot 88 receives a garter spring 92 so that the jaws are held axially with respect to driving disk 72 between the garter spring and jaw shoulders 82. The garter spring may comprise a coiled wire spring as illustrated in the figures, or any other suitable construction, for example an expandable polymer collar.

The jaws are rotationally fixed to the driving disk through slots 78. Since the jaws prevent the driving disk from rotating with respect to the spindle, rotation of sleeve 30 with respect to the spindle moves driving disk 72 axially with respect to chuck axis 28 by the cooperation between threads 68 and 74. Depending on the sleeve's rotational direction, the driving disk moves axially forward or backward on the spindle and bears either on shoulders 82 or garter spring 92 to move jaws 32 axially in slots 40 to an open or closed position.

Figure 9:
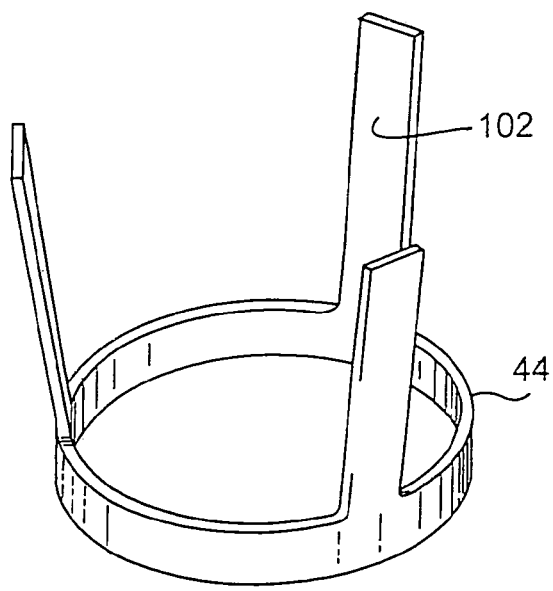
FIG. 9 is a perspective view of a guide ring for use in an embodiment of the present invention.

Garter spring 92 helps to maintain the jaws in an aligned position in passageways 40. Specifically, as jaws 32 are pushed axially forward toward nose section 36, jaw outer surfaces 94 tend to push against an edge 96 defined by distal spindle end 34 at the outer edge of passageways 40. The jaws could pivot on this edge, assuming guide ring 44 were not present, pushing jaw noses 98 radially inward and end sections 80 radially outward. The garter spring, however, applies a radially inward force rearward of the passageways. This biases the jaws' outer surfaces 94 against each passageway's inner surface 100 and thereby restrains the jaws from pivoting at edges 96. Additionally, guide ring 44 includes a frustoconical inner circumferential surface 102 that extends rearwardly from the passageways 40 to guide the jaws, thereby preventing the jaws from pivoting outward behind edges 96. FIG. 9 illustrates an embodiment of the guide ring in which the frustoconical surface is formed by three equiangularly spaced fingers that extend rearwardly from a base ring over the jaw passageways.

Figure 7:
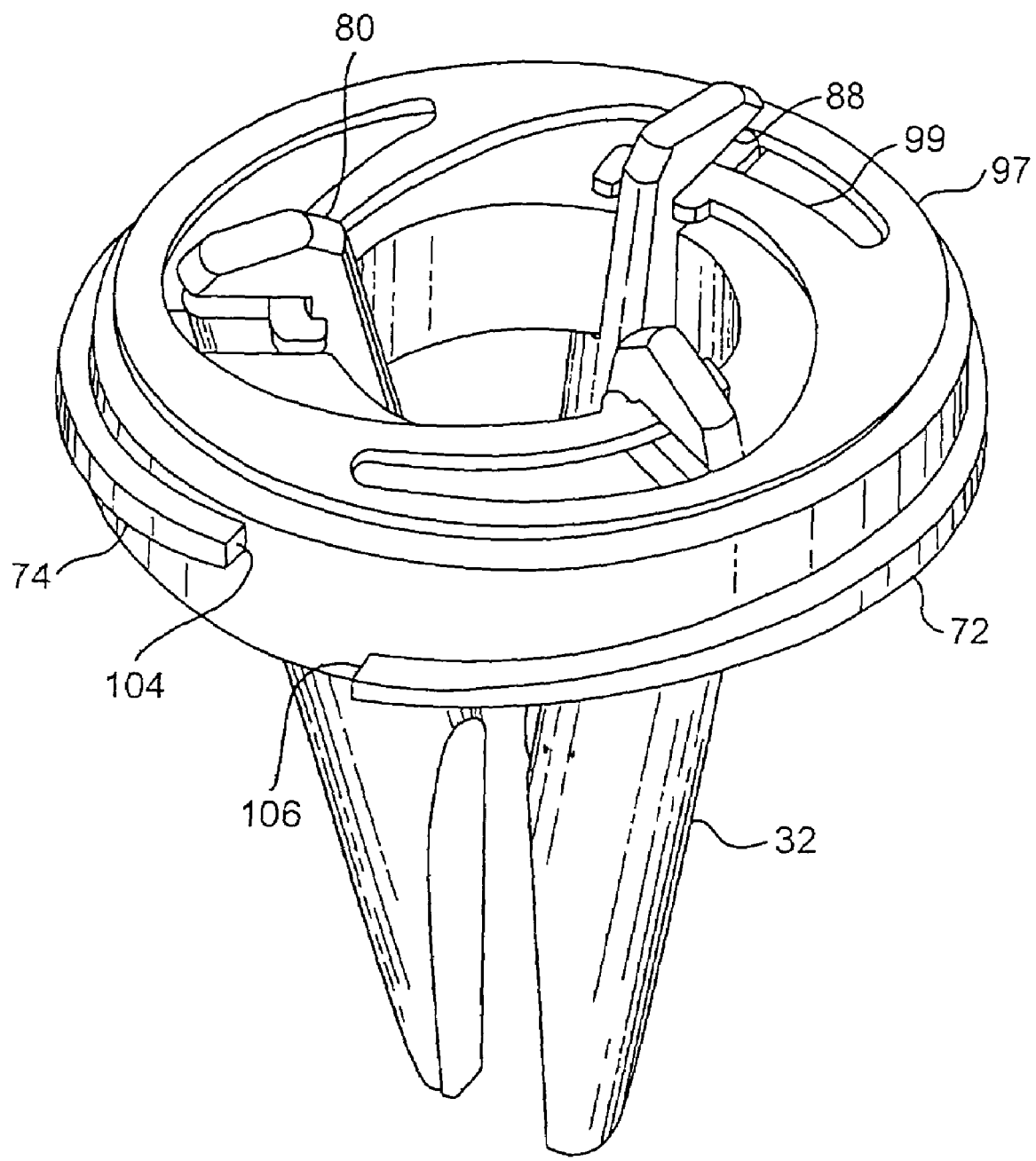
FIG. 7 is a perspective view of a nut and jaws for use in an embodiment of the present invention.

It should be understood that any suitable mechanism may be used to retain the jaws axially within the jaw passageways. For example, referring to FIG. 7, the garter spring may be replaced by an annular ring 97 rearward of driving disk 72 that surrounds rear jaw ends 80. Ring 97 includes three spring arms 99 that extend radially inward from the annular ring. Each arm defines a distal end that is biased radially inward and that is received by a respective slot 88 in a rear jaw end 80. Due to the radially inward bias of the spring arms, the spring arm distal ends maintain contact with the jaw ends as they move radially inward when the jaws move forward to a closed position.

Figure 8:
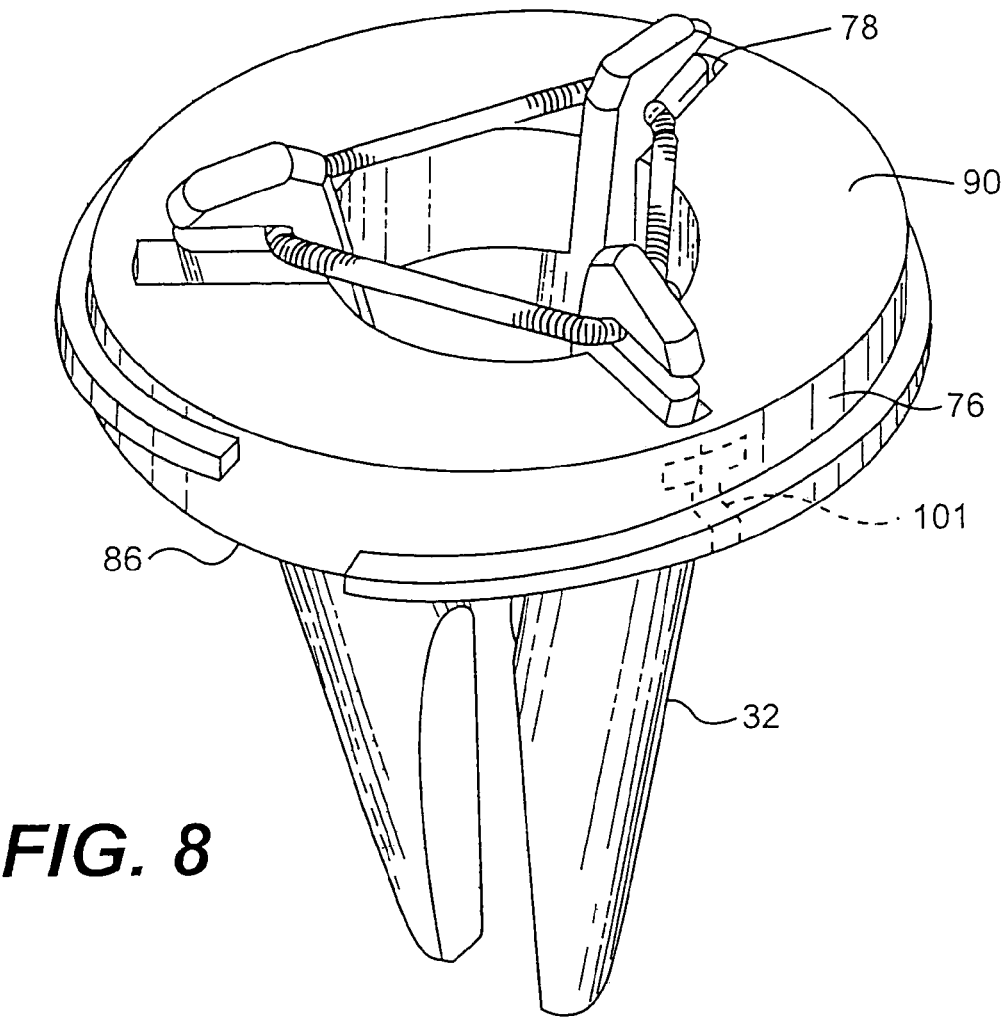
FIG. 8 is a perspective view of a nut and jaws for use in an embodiment of the present invention.

Furthermore, referring to FIG. 8, the driving disk may be formed with T-shaped slots (shown in phantom at 101) instead of straight slots 78. Each of three equiangularly spaced T-shaped slots extends radially into the driving disk from surface 76 parallel to front and rear faces 86 and 90, and may extend entirely through the disk. The jaw end sections are formed in a corresponding T-shape so that the T-shaped slots in the driving disk slidably receive respective jaws. The slots allow the jaw ends to move radially as the driving disk moves the jaws between opened and closed positions. A dry lubricant coating may be provided on the jaw ends and/or the driving disk slots to facilitate this movement. The cooperation between the jaw ends and the driving disk slots maintains the jaws at the proper angle with respect to the driving disk so that the jaws are maintained in alignment in the jaw passageways in the assembled chuck.

Referring again to FIGS. 3 and 4A, rotation of sleeve 30 clockwise, when viewed from spindle forward section 36, moves driving disk 72 axially forward with respect to chuck axis 28, thereby moving jaws 32 to a closed position. Conversely, counterclockwise rotation of sleeve 30 moves the jaws in an opening direction. A stop (not shown) may be provided at the rear edge of threads 68. When the jaws reach a fully opened position, a rear edge 104 of thread 74 abuts the stop. This prevents further rotation of the sleeve with respect to the driving disk and thereby prevents the jaws from binding in the chuck's rear area. A similar stop (not shown) is provided at the front end of thread 68 to stop a forward edge 106 of thread 74 to prevent the jaws from binding in the fully closed position when there is no tool in the chuck bore.

Figure 6:
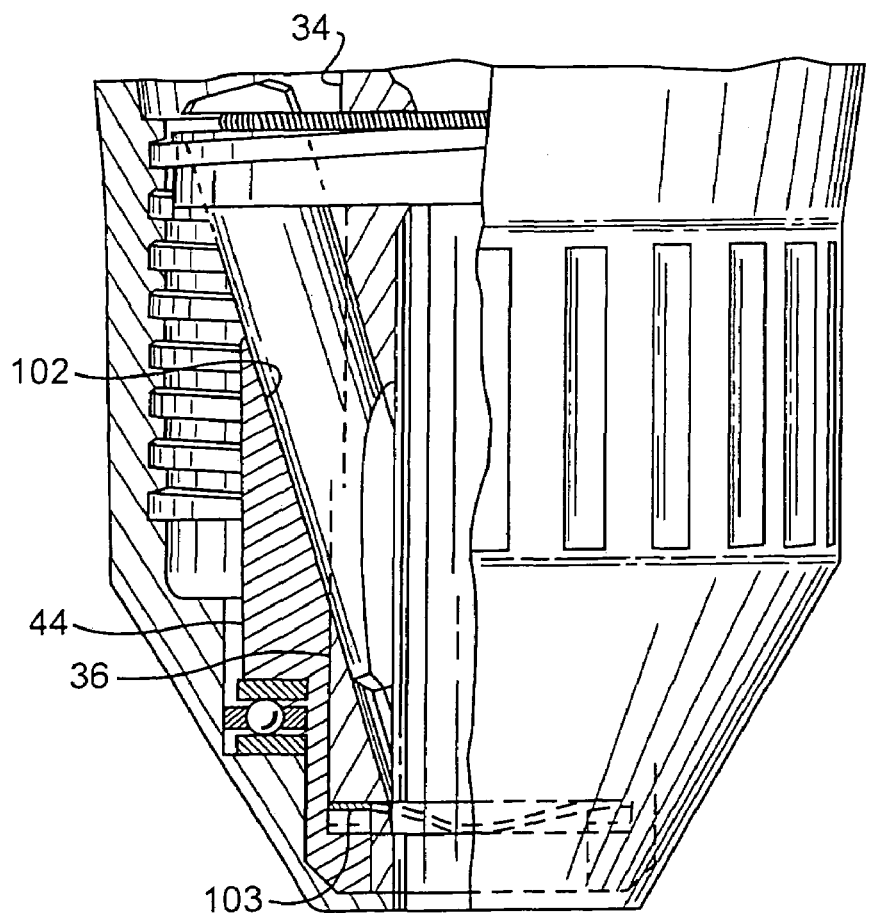
FIG. 6 is a partial cutaway view of a power driver in accordance with an embodiment of the present invention.

When jaws 32 clamp onto a tool shank, rearward axial force is translated to sleeve 30 through the jaws and the driving disk. This force is transferred to spindle distal end 34 through bearing assembly 50 at shoulder 48 of guide ring 44. Referring to FIG. 6, guide ring 44 may be mounted on the spindle in a clearance fit, rather than a press fit or other attachment means, so that the guide ring may move axially on the spindle front end. A spring washer 103 is disposed between the guide ring and the spindle so that the spring applies a compression force therebetween. When the jaws tighten onto a tool so that they apply a rearward axial force to the sleeve, the force is transferred to the spring through the bearing assembly and the guide ring. This compresses the spring and allows the guide ring to move rearwardly to maintain a guiding contact with the jaws at frustoconical surface 102. A snap fit may be provided between the sleeve and a clutch ring 108 (FIG. 2) to retain the sleeve in the axially forward direction.

In the chuck construction shown in FIGS. 1–4, jaws 32 do not extend rearward of sleeve 30. Accordingly, while clutch ring 108, described in more detail below, may define a relatively extended length as shown in FIGS. 1 and 2, the clutch ring may be considerably shortened. This, and the construction of the chuck within the chuck spindle, may contribute to a more compact construction of power driver 10.

It should be understood, however, that various chuck arrangements may be used in conjunction with the present invention. For example, referring to FIG. 5, passageways 40 are again formed in forward section 36 of a distal end of spindle 16 opposite the motor. The passageways accommodate jaws 32, each of which has a tool engaging face 42 generally parallel to the chuck axis and threads 110 on its opposite or outer surface. Threads 110 of any suitable type and pitch may be utilized within the scope of the present invention.

The chuck includes a thrust ring member 112 which, in one embodiment, is integral with the spindle. The thrust ring includes a thrust face having an arcuate seating surface for engagement with the inner race of a self-contained anti-friction bearing assembly 114. The thrust ring member includes a plurality of jaw guideways (not shown) extending therethrough to permit retraction of jaws 32 therethrough.

A nut 116 includes threads for mating with threads 110 on jaws 32 whereby when the nut is rotated with respect to the spindle, the jaws are advanced or retracted, depending on the nut's rotational direction. The nut is a split nut and is adapted to receive a retaining band 118 for maintaining the nut together after it is assembled. Retaining band 118 is pressed to nut 116 and is co-molded with sleeve 30. Thus, rotation of sleeve 30 rotates nut 116. A metal nosepiece 120 may be pressed onto forward section 36 forward of the sleeve.

A split nut is utilized because of the diameter of forward section 36 of the spindle. Where the spindle diameter is less than the nut's inner diameter, a one-piece nut may be used. In such an embodiment, a nut retainer may be pressed onto spindle forward section 36 to axially retain the nut. Such a construction is illustrated in U.S. Pat. No. 5,501,473, the entire disclosure of which is incorporated herein by reference.

Accordingly, it should be understood that any suitable chuck construction may be used within the present invention and that the particular embodiments illustrated in the figures are provided by way of example only and are not intended to limit the present invention. One exemplary chuck construction is illustrated in co-pending U.S. provisional patent application 60/134,350 filed May 14, 1999, which is incorporated by reference herein.

Figure 4B:
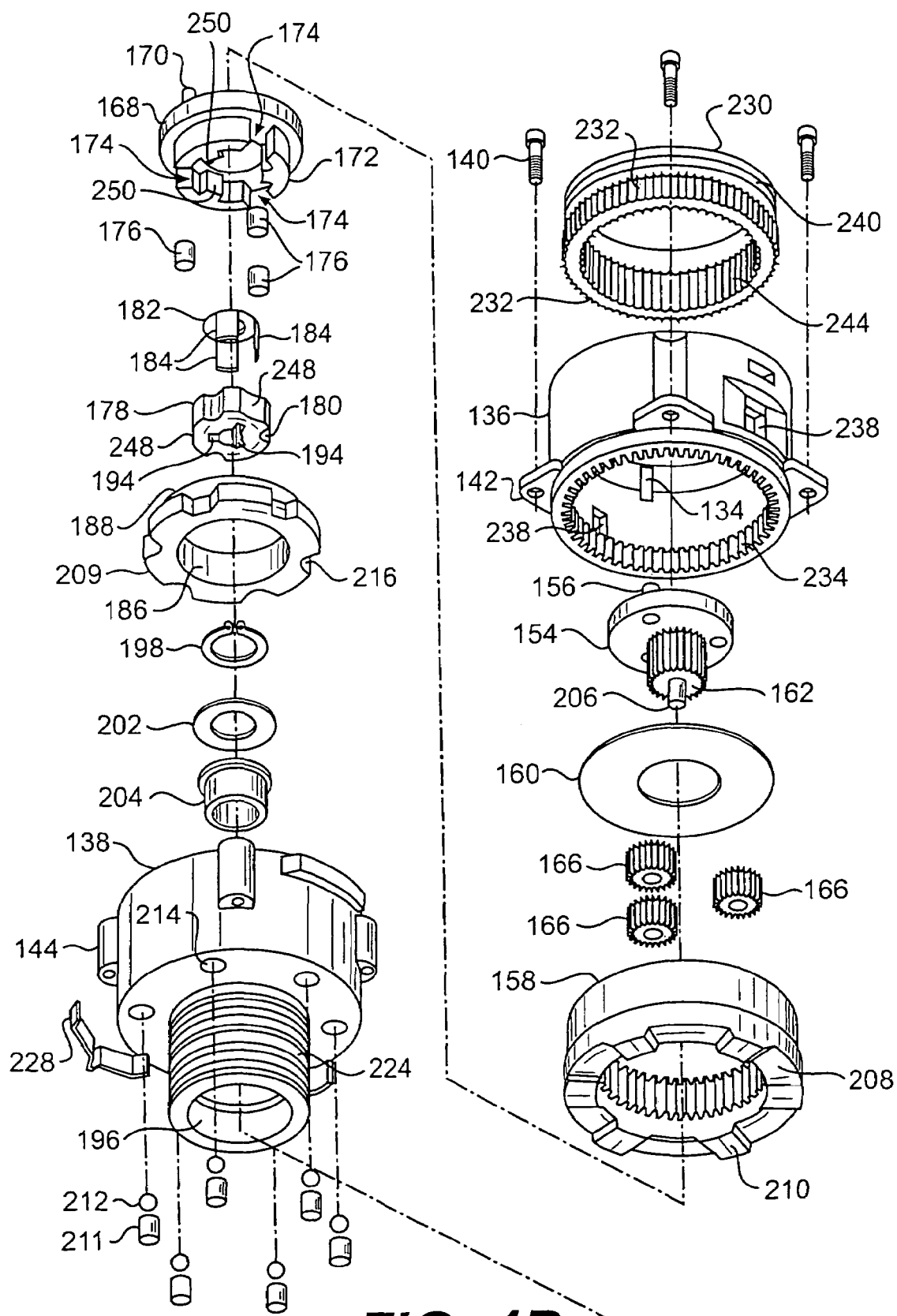
Figure 4C:
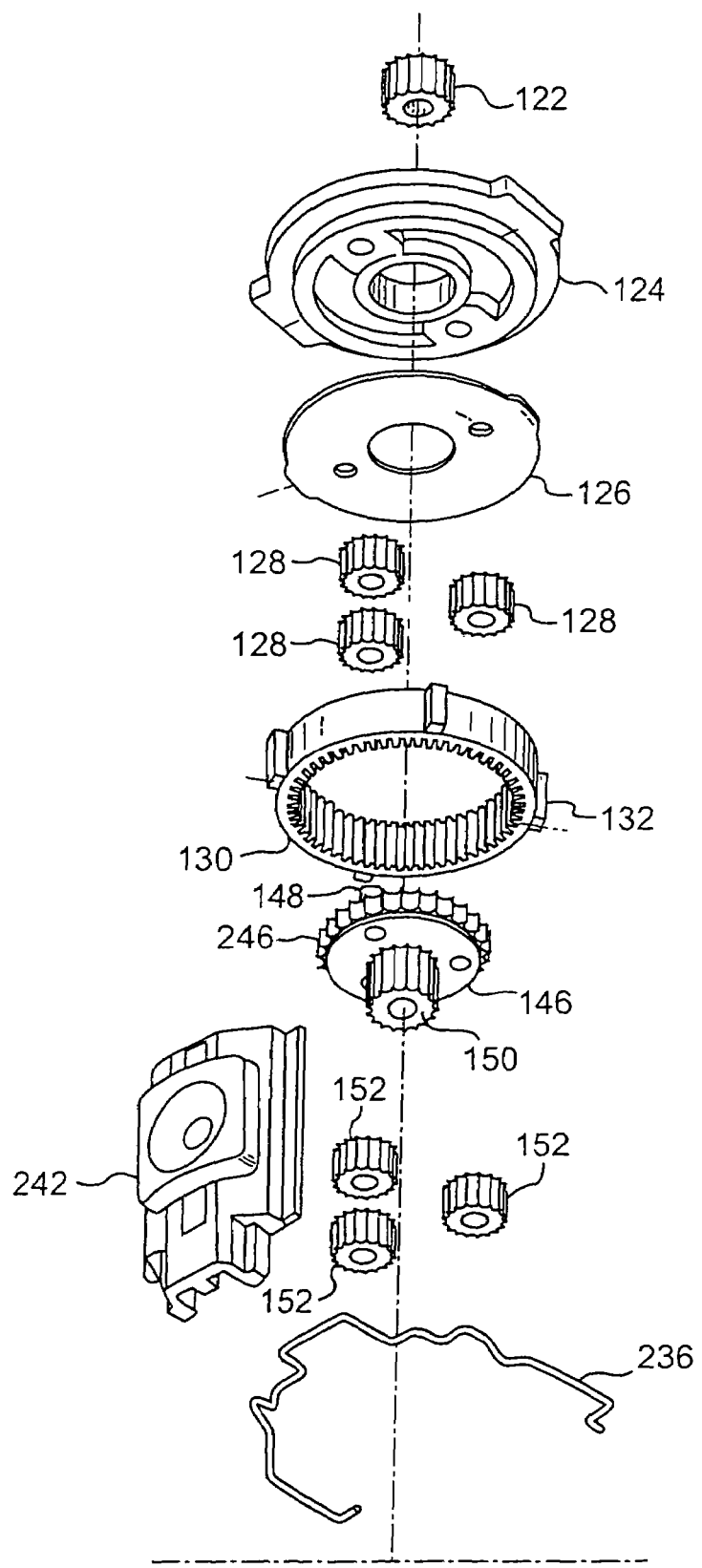
Figure 5:
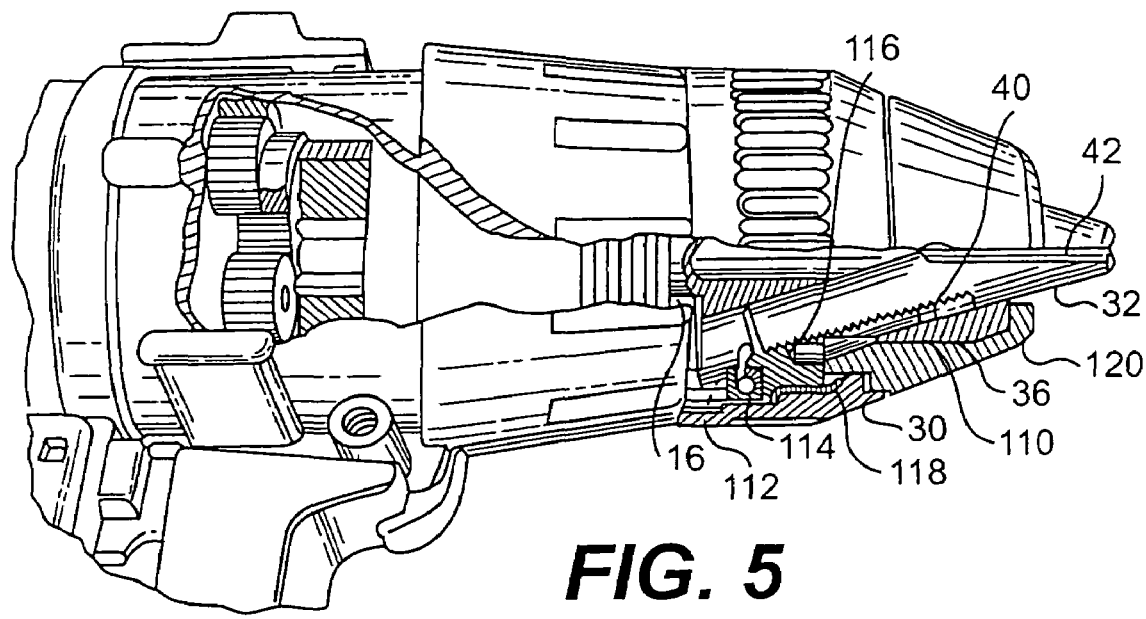
FIG. 5 is a partial cutaway view of a power driver in accordance with an embodiment of the present invention.

As discussed above, the chuck is opened and closed by actuation of a driver, for example including a driving disk nut as shown in FIGS. 1–4 or an internally threaded nut as shown in FIG. 5, with respect to the spindle so that a grip, for example comprising jaws 32, is moved radially away from or toward the forward spindle bore. In the illustrated embodiments, the driver includes a sleeve that is rotated relative to the spindle to move the nut. Due to frictional forces, however, rotation of the sleeve also tends to urge rotation of the spindle. Accordingly, in one preferred embodiment of the present invention, a spindle lock is provided so that the spindle is rotationally fixed to the drill housing when a rotational force other than the motor force is applied to the spindle. Thus, when an operator rotates the sleeve, thereby applying a rotational force to the spindle, the spindle lock rotationally locks the spindle so that the sleeve rotates with respect to the spindle.

Various spindle lock arrangements should be understood by those skilled in this art, and it should therefore be understood that any suitable such mechanism is encompassed by the scope of the present invention. FIGS. 4A–4C, however, provide one exemplary spindle lock arrangement within a gear assembly 18 (FIG. 2). Referring to these figures, the driver motor rotationally drives a motor pinion 122 that extends through the central bores of a motor spacer 124 and washer 126 mounted to the motor. Motor pinion 122 extends between and rotationally drives 3 planet gears 128 that engage, and rotate within, a ring gear 130. Ring gear 130 includes splines 132 that are received in grooves 134 of a rear gear housing 136 so that ring gear 130 is rotationally fixed to the rear housing. Rear gear housing 136 is, in turn, secured to a front gear housing 138 by screws 140 that extend through holes in tabs 142 and that are received by holes defined in tabs 144 of the front housing. The gear housing is rotationally fixed with respect to the motor and the driver housing.

Each planet gear 128 is secured to a sun gear plate 146 by a respective pin 148 that extends through the planet gear. Thus, when motor pinion 122 rotationally drives planet gears 128, the planet gears move about the inner circumference of ring gear 130, thereby rotationally driving sun gear plate 146. This rotationally drives a pinion 150 extending axially forward from sun gear plate 146.

Three planet gears 152 are disposed about pinion 150 so that the planet gear teeth interengage with the teeth of pinion 150. Each planet gear 152 is attached to a sun gear plate 154 by a respective pin 156 that extends through the planet gear. Accordingly, sun gear plate 154 rotates with planet gears 152 as the planet gears rotate about the spindle axis.

Sun gear plate 154 is received within a ring gear 158 against a washer 160 so that a pinion 162 extends into the ring gear within ring gear teeth 164. Ring gear 158 is rotationally held to the gear box housing as described below. Three planet gears 166 are disposed between pinion 162 and ring gear 158 so that the planet gear teeth interengage with teeth 164 and the teeth of pinion 162. Since ring gear 158 is rotationally held to the gear box housing, rotation of sun gear plate 154 and pinion 162 moves planet gears 166 about the spindle axis.

Each planet gear 166 is attached to a carrier 168 by a respective pin 170 that extends through the planet gear. Accordingly, the planet gears rotationally drive carrier 168 as the planet gears are driven about the spindle axis by sun gear plate 154 and pinion 162.

Carrier 168 includes three axially forward-facing annular segments 172. Three gaps 174 between the annular segments receive respective lock rollers 176. A lock cam 178 received within annular segments 172 is aligned with the annular segments so that flats 248 defined in the outer circumferential surface of the lock cam are radially aligned with gaps 174. Thus, lock rollers 176 are disposed in gaps 174 between flats 248 and an inner circumferential surface 186 of a lock ring 188 within which carrier 168 and lock cam 178 are received. The lock cam's outer surface also defines grooves 180 that receive dogs 250 extending inward from segments 172. A spacer washer 182 sits between pinion 162 and lock cam 178 and includes three fingers 184 that extend between the lock cam and carrier 168.

Lock cam 178 includes a center bore that receives a rear end 190 of spindle 16. Spindle 16 includes three splines 192 that are received in corresponding slots 194 extending radially outward from the lock cam's center bore so that the spindle is rotationally fixed to the lock cam. Spindle 16 is centered in the gear box housing by bearing 195 that is received at the forward end of a central bore 196 in front gear housing 138. A C-clamp 198 is received in a groove 200 in spindle 16 to secure the spindle in the axially forward direction against a washer 202 and a bushing 204 held within front gear housing 138.

When assembled, rear end 190 of spindle 16 extends into lock cam 178 and carrier 168. A pin 206 extending axially forward from pinion 162 of sun gear plate 154 is received by an axial bore (not shown) in spindle end section 190, thereby centering the sun gear plate.

As noted above, ring gear 158 is rotationally held within front gear housing 138. The ring gear includes a forward face 208 that defines axially forward extensions 210 having sloped side surfaces. The forward section of ring gear 158 extends over carrier 168 and over the rearward section of lock ring 188 so that forward face 208 abuts an inner surface (not shown) of front gear housing 138 through which holes 214 extend. This inner surface defines recesses that correspond to splines 209 and gaps 216 in lock ring 188 so that the inner surface receives and rotationally fixes the lock ring with respect to front gear housing 138.

A cylinder 211 and ball 212 pair extends through each hole 214 in front gear housing 138 so that balls 212 abut front face 208 of ring gear 158. Cylinders 211 and balls 212 are held in position by a washer 218 pressed against front gear housing 138 by a coil spring 220. The coil spring pressure is regulated by a nut 222 threaded onto a forward extension 224 of front gear housing 138. Nut 222 includes radial extensions 226 received in respective grooves (not shown) in clutch ring 108. Thus, rotation of the clutch ring moves nut 222 axially forward and backward on extension 224 to release and compress spring 220, thereby controlling the pressure by which balls 212 are applied to front face 208 of ring gear 158.

The application of balls 212 against the front face of ring gear 158, along with the sloped side surfaces of forward extensions 210, form a clutch that determines the maximum rotational force that the spindle may apply to a workpiece. As discussed above, the spindle is driven by sun gear plate 168 that rotationally drives lock cam 178 through lock rollers 176. Sun gear plate 168 is, in turn, rotationally driven by planet gears 166. When pinion 162 rotates, pinion 162 and planet gears 166 rotate ring gear 158 until the sloped side surfaces of extensions 210 abut balls 212. At this point, balls 212 rotationally hold ring gear 158 with respect to front gear housing 138, and planet gears 166 begin rotating about the spindle axis along ring gear teeth 164, thereby rotating sun gear plate 168 and spindle 16. If a tool held in the chuck is engaged with a workpiece so that the spindle's rotation is resisted, resistance is translated back through spindle 16 and sun gear plate 168 so that rotation of planet gears 166 about the spindle axis is also resisted. When this resistance reaches a sufficient level, the planet gears cease rotation about the spindle axis. Because pinion 162 still drives the planet gears, however, the planet gears rotate about their respective pins 170. This rotates ring gear 158 so that the sloped side surfaces of extensions 210 push balls 212 and cylinders 211 axially forward against the pressure of washer 218 and coil spring 220. As ring gear 158 rotates, a spring 228 is deflected to make a clicking sound to notify the operator that the spindle is no longer rotating. The amount of rotational resistance to the spindle required to activate the clutch is determined by the compression force of spring 220 and the angle of the sloped side surfaces of extensions 210.

The gear box is constructed so that, for a given rotational speed of motor pinion 122, the spindle may rotate at either of two speeds. As discussed in detail above, sun gear plate 168 rotationally drives spindle 16, and sun gear plate 154 rotationally drives sun gear plate 168 through pinion 162, planet gears 166 and ring gear 158. On the opposite end, motor pinion 122 rotationally drives sun gear plate 146 through planet gears 128 and ring gear 130. The transmission of rotational force between sun gear plate 146 and sun gear plate 154, however, depends upon the rotational position of an adjustable ring gear 230.

A shift arm 236 extends about the exterior of the rear gear housing so that the ends of the shift arm extend through gear housing notches 238 and into an annular groove 240 extending about the rear outer surface of ring gear 230. A switch knob 242 disposed on the driver housing is attached to the shift arm so that axial movement of the switch knob on the driver housing moves adjustable ring gear 230 axially with respect to the spindle.

In a forward axial position of ring gear 230, teeth 232 defined about the ring gear's forward outer circumference interengage teeth 234 defined about the inner circumference of rear gear housing 136 so that the ring gear is rotationally fixed to the gear housing. Additionally, teeth 244 about the interior of the ring gear interengage with the teeth of planet gears 152. Thus, as motor pinion 122 rotationally drives sun gear plate 146, pinion 150 drives planet gears 152 so that they rotate about the spindle axis along teeth 244 of the ring gear 230, thereby rotationally driving sun gear plates 154 and 168.

When switch knob 242 moves ring gear 230 rearward to its second axial position, teeth 232 disengage from teeth 234 so that ring gear 230 is rotatable with respect to the gear housing. Teeth 244 now interengage both with the teeth of planet gears 152 and with teeth 246 about the outer circumference of sun gear plate 146. Planet gears 152 therefore rotate in unison with sun gear plate 146. Thus, sun gear plate 154 rotates at the same speed as sun gear plate 146, thereby causing spindle 16 to rotate at a faster speed.

The transmission of rotational force through the gear assembly operates as described above as long as rotational force is applied by the motor through motor pinion 122. More specifically, the angular width of dogs 250 is slightly less than the width of gaps 180, and gaps 174 are wider than lock rollers 176. When the motor drives carrier 168, the carrier rotates slightly with respect to the lock cam until dogs 250 engage the sides of grooves 180 and sides 252 of gaps 174 engage the lock rollers. Upon the carrier's further rotation, dogs 250 rotationally drive the lock cam through gaps 174. Gap sides 252 maintain the rollers in position on flats 248 as the lock cam and carrier rotate within lock ring 188. Gap sides 252 are slightly angled to prevent the rollers from wedging between sides 252 and lock ring inner surface 186.

If, however, the motor is deactivated and the spindle is rotated, for example by rotation of sleeve 30 to open or close the chuck, the spindle rotates lock cam 178 with respect to carrier 168. There is a slight clearance between the rollers and lock ring surface 186 when the rollers are on flats 248. As the lock cam rotates in either direction, the rollers roll up the flats and against inner surface 186, preventing further rotation of the lock cam and, therefore, the spindle.

As discussed above, it should be understood that various suitable spindle lock arrangements may be employed within the scope of the present invention. For example, the spindle lock mechanism may be disposed on either side of the gearing. Thus, while in the embodiment illustrated in the drawings the cam is in rotationally driving engagement with the spindle through direct attachment to the spindle, the cam may also drive the spindle through a gearing arrangement. In such an embodiment, the drive plate (carrier 168 in the embodiment illustrated in FIGS. 4A–4C) may be directly attached to the motor output.

In another preferred embodiment, the three carrier segments 172 in FIG. 4B are replaced by two segments spaced apart from each other on the carrier face. Each segment defines a gap in which a lock roller is disposed.

Lock cam 178 defines a circular outer circumferential surface within the carrier segments. Flats are defined on opposite sides of this surface and are aligned with the lock rollers so that the rollers sit between the flats and inner surface 186 of lock ring 188. Two generally wedge-shaped tabs extend radially outward from opposite sides of the lock cam surface and have angled sides generally aligned with radii of the lock cam. The tabs are offset approximately 90 degrees from the flats and extend into the spaces between the carrier segments.

The angular width of the tabs is slightly less than the width of the space between the carrier segments, and the carrier gaps are wider than the rollers. When the motor drives carrier 168 (FIG. 4B), the carrier rotates slightly with respect to the lock cam until the carrier segments, or dogs, engage the lock cam tabs. The carrier gap sides engage the lock rollers. Upon the carrier's further rotation, the carriers rotationally drive the lock cam through the tabs, and the gap sides maintain the rollers in position on the flats as the lock cam and carrier rotate within the lock ring. The sides of the carrier gaps are slightly angled to prevent the rollers from wedging between the sides and lock ring inner surface 186 (FIG. 4B).

If, however, the motor is deactivated, and the spindle is rotated from its distal end, the spindle rotates the lock cam with respect to the carrier. There is a slight clearance between the lock rollers and the lock ring inner surface when the rollers are on the flats. As the lock cam rotates in either direction, the rollers roll up the flats and against the lock ring inner surface, preventing further rotation of the lock cam and the spindle with respect to the lock ring and the housing.

In addition, externally-actuated and ratchet-type spindle lock mechanisms may be used in conjunction with or in place of the cam-type spindle locks discussed above. For example, where lock rollers 176, lock ring 208, and lock cam 178 are omitted, and carrier 168 directly drives the spindle through a splined interface, a pin may be provided that extends through housing 12 (FIG. 1) adjacent the spindle. A spring set in the housing biases the pin away from the spindle, which includes a keyway adjacent the pin's interior end. When the keyway aligns with the pin, and an operator depresses the pin, the keyway receives the pin to prevent the spindle's further rotation. Actuation of the pin may also disconnect the motor from battery 24 (FIG. 1) to prevent the motor's actuation while the spindle is locked. Furthermore, the pin may directly engage the spindle or may engage the gearing assembly to prevent the spindle's rotation.

In one embodiment of a ratchet-type spindle lock, the motor drives the output shaft, for example through a gear assembly. A driving plate and a driven plate are disposed at the spindle, the motor output or a point within the gear assembly and are rotatable with respect to each other over a limited arc. When the plates are aligned in the center of this arc, a spring-biased detent, for example a conical pin or a ball, extends from one of the plates (the "first plate") into a groove in the other plate (the "second plate"). The detent pushes a pawl radially outward to engage the teeth of a ratchet that is rotationally fixed to the housing. The pawl is in rotationally driving engagement with the spindle. Thus, the spindle is rotationally fixed to the housing. However, rotation of the motor in either direction rotates the first plate with respect to the second plate by one-half the angular play between the plates. Since the first plate carries the detent, this forces the detent out of the second plate groove back against the spring force, releasing the pawl from the ratchet and, therefore, rotationally releasing the spindle from the housing. Further rotation of the first plate by the motor drives the second plate and, therefore, the output shaft.

In another ratchet-type embodiment, a ratchet ring is rotationally fixed to the housing. A pawl plate is in rotationally driving engagement with the spindle and has two pawls pivotally attached thereto that are spring-biased outward so that the pawls engage the ratchet teeth. The pawls are disposed so that if the spindle applies rotational force to the plate in one rotational direction, a first of the pawls catches in the ratchet teeth to prevent the spindle's rotation. The other pawl catches when the spindle is rotated in the other direction.

The motor rotationally drives a drive plate that is rotatable with respect to the pawl plate over a limited arc. As the drive plate travels over this arc, it disengages the pawl that blocks the pawl plate's rotation in the direction in which the drive plate is rotating. The other pawl does not catch in that direction. Thus, at the end of the arc, the drive plate engages and rotates the pawl plate and, therefore, the spindle.

Figure 10:
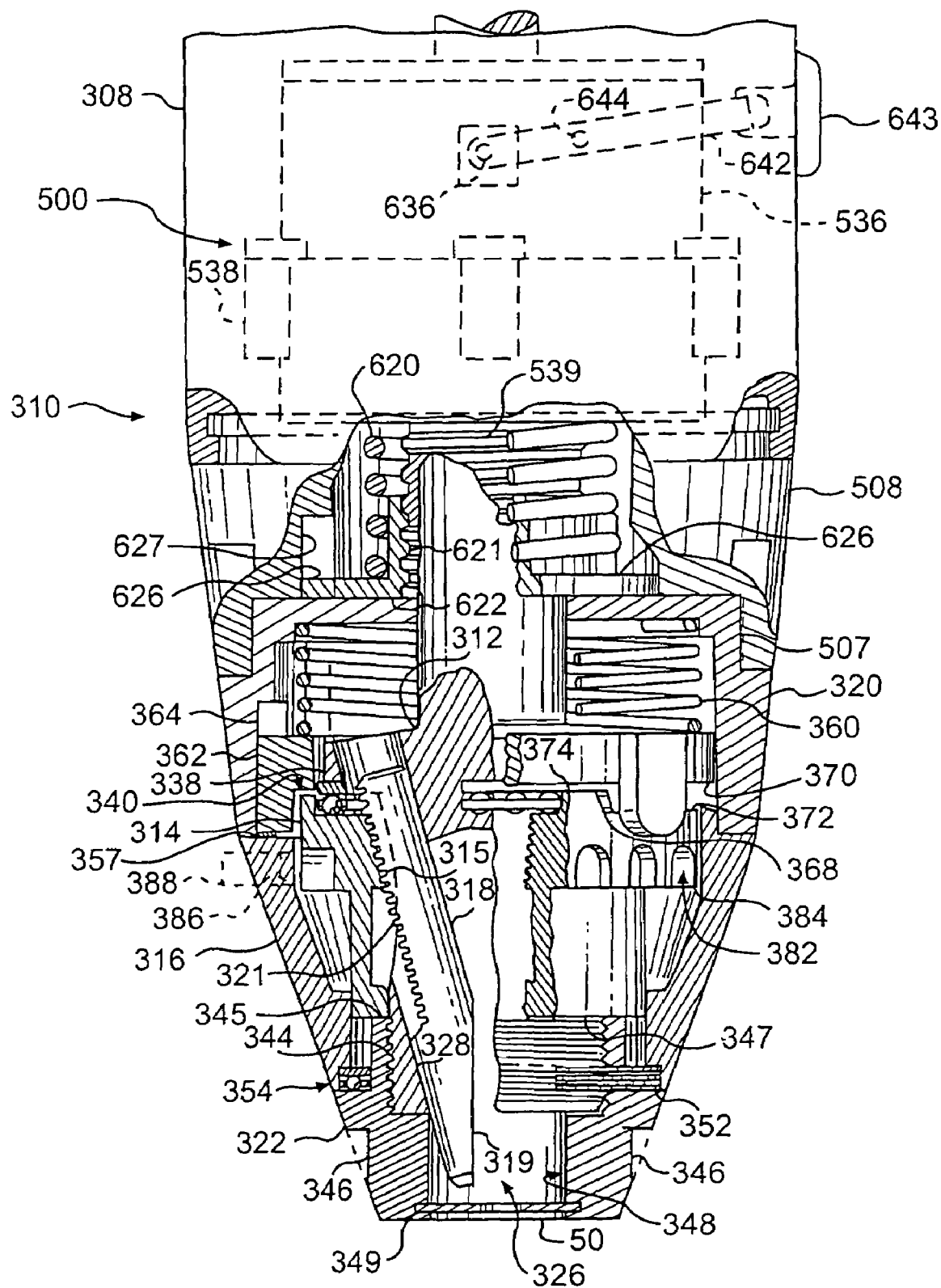
FIG. 10 is a partial plan view of a chuck and gearbox in accordance with an embodiment of the present invention.

Referring to FIG. 10, a chuck 310 includes a body 312, a nut 314, a front sleeve 316, a plurality of jaws 318, and a rear sleeve 320. Rear sleeve 320 includes longitudinal ribs along its rearward outer surface that are received by longitudinal grooves in the inner surface of a clutch ring 508, thereby rotationally locking sleeve 320 to ring 508. As described in more detail below, an operator may rotate ring 508 to adjust the maximum torque applicable by the motor to a tool held by the chuck. During operation, however, frictional forces within the driver are sufficient to hold ring 508. Thus, in operation, ring 508 holds rear sleeve 320 with respect to the driver housing. It should be understood that various chuck and gearbox configurations and combinations may be employed within the present invention and that any suitable means may be used to hold the rear sleeve to the driver housing.

Figure 11A:
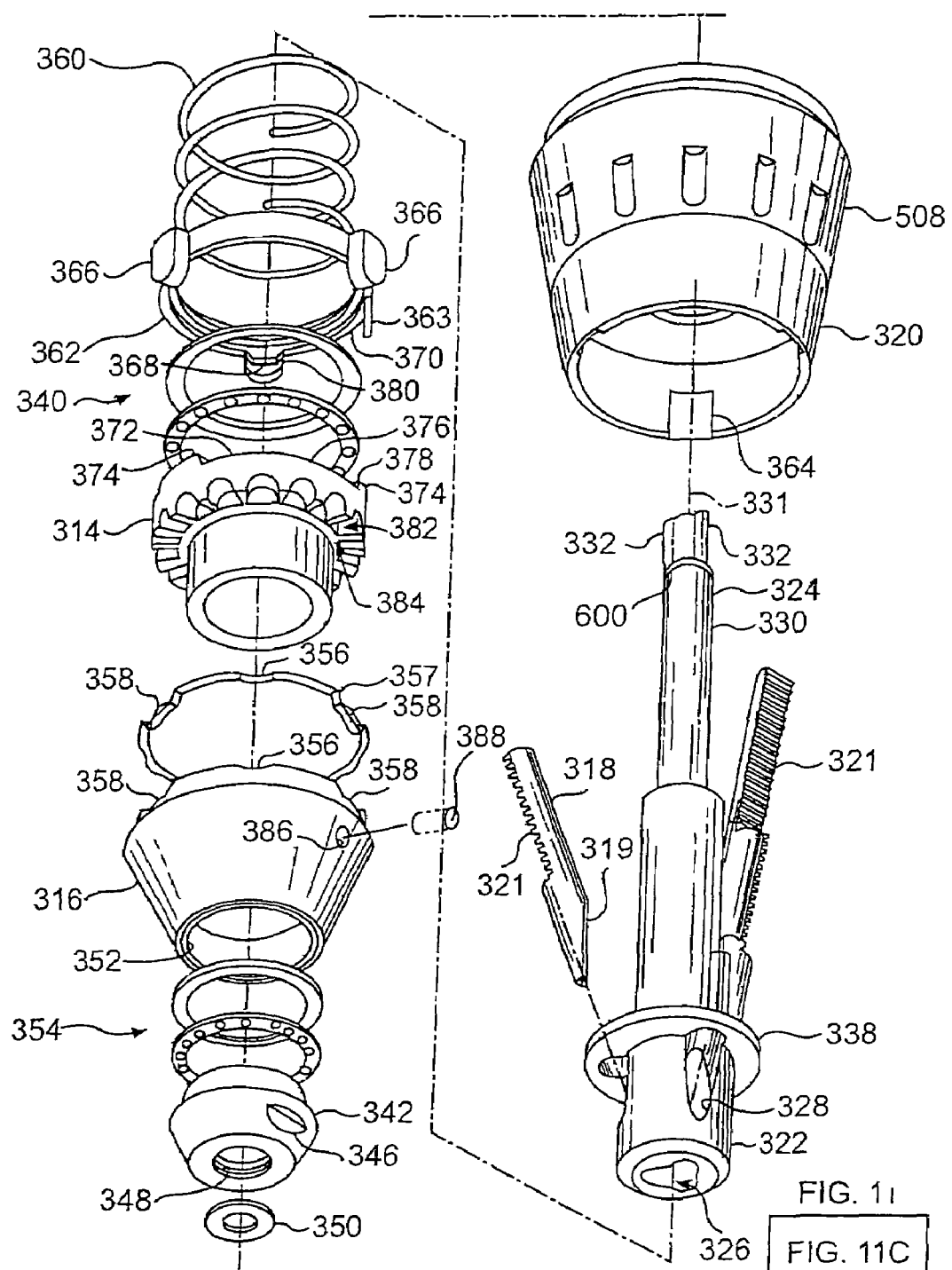
FIG. 11A is a partial exploded view of a chuck and gearbox in accordance with an embodiment of the present invention.

Referring also to FIG. 11A, body 312 includes a nose or forward section 322 and a tail or rearward section 324. An axial bore 326 is defined in body nose section 322 and includes a plurality of passageways 328 that slidably receive jaws 318. Passageways 328 are angled with respect to a chuck axis 331 and intersect at a common point within or slightly forward of axial bore 326. Body 312 defines a thrust bearing ring 338 through which a portion of passageways 328 pass. A bearing assembly 340 is disposed between thrust bearing ring 338 and an axially rearward facing surface of nut 314.

Each jaw 318 defines a tool engaging face 319 and threads 321 on opposing surfaces thereof. Nut 314 is generally cylindrical and includes threads 315 defined at the nut's rearward end that engage the jaw threads to drive the jaws within their respective passageways 328. Preferably, three jaws are employed, and each jaw is separated from its adjacent jaw by an arc of approximately 120 degrees.

As shown in FIG. 11A, body tail section 324 includes an axially rearward extending spindle portion 330. Spindle portion 330 defines a plurality of radial splines 332 at its rearward end for engagement with corresponding grooves 334 defined in a lock cam 336 (FIG. 11B) disposed within the gearbox housing. Spindle portion 330 includes an annular groove 600 defined axially forward of splines 332.

As shown in FIG. 10, body nose section 322 receives a nose piece 342 threaded onto the body at 344. It should be understood, however, that nose piece 342 may be attached to body 312 by any suitable method, for example a press-fit as shown in FIG. 1A where nose section 322 defines a smooth cylindrical surface without threads. Nose piece 342 includes opposing flat surfaces 346.

A washer shaped dust protection ring 350 is disposed within an annular groove 349 defined in an inner surface 348 of nose piece 342. Dust ring 350 is made, for example, from an elastomeric or other flexible material and closes around a tool shank received within axial bore 326 to cover the gap between the tool shank and nose piece surface 350.

Front sleeve 316 includes an annular ledge 352 at its axially forward end that receives a bearing assembly 354 disposed between nose piece 342 and sleeve 316. Thus, front sleeve 316 is rotatable with respect to body 312 and holds sleeve 320 against movement in the forward axial direction with respect to the body. Nose piece 342 also holds nut 314 against movement in the forward axial direction with respect to body 312 by engagement between a rearward axial face 345 of nose piece 342 and a forward axial face 347 of nut 314. Thus, nut 314 is axially held to, but is rotatable with respect to, the body. It should be understood that the forward portion, including forward face 347, of nut 314 could be replaced by a separate cylindrical spacer situated between the nut and nose piece rearward axial face 345.

As shown in FIG. 11A, front sleeve 316 includes a plurality of alternating shallow and deep recesses 356 and 358 defined on an axially rearward facing surface of the sleeve. A wear resistant ring 357 may be provided between front sleeve 316 and thrust ring 362 that define recesses 356 and 358 corresponding to the sleeve recesses. A spring 360 disposed within rear sleeve 320 biases thrust ring 362 forward so that front ends of splines 366 extending outward from ring 362 engage front sleeve 316 through ring 357. Rear sleeve 320 includes a plurality of axially extending slots 364 in its inner circumference that slidably receive splines 366 so that thrust ring 362 is rotationally fixed, but axially movable, with respect to rear sleeve 320.

Nut 314 includes teeth 374 extending rearwardly from an axially rearward facing surface 376 of the nut. Gaps between the teeth are indicated at 372. Nut teeth 374 define sloped side surfaces 378. In the embodiments illustrated in the drawings, three thrust ring splines 366, three nut teeth 374, and three thrust ring teeth 368 are employed.

Thrust ring 362 includes a front face 370 disposed radially inward of splines 366. A plurality of teeth 368 extend forward from the front face. In an impact mode, wherein sleeve 316 is rotated so that splines 366 are received by deep recesses 358, spring 360 biases the thrust ring forward so that teeth 368 are received by gaps 372. When an operator drives the motor so that body 312 rotates about chuck axis 331, frictional forces cause body 312, jaws 318, and nut 314 to rotate together until sloped surfaces 378 on nut teeth 374 abut sloped surfaces 380 on thrust ring teeth 368. Since thrust ring 362 is rotationally held to rear sleeve 320, the thrust ring stops the nut's rotation, and further rotation of body 312 causes relative rotation between the body and the nut to advance or retract the jaws in passageways 328. Accordingly, the chuck can be opened or closed through actuation of the drill without gripping the chuck.

When the chuck reaches a fully closed position, such that the jaws have closed onto a tool shank and are no longer able to move axially within passageways 328, the nut threads wedge with the jaw threads. When the rotational force between thrust ring 362 and nut 314 overcomes the biasing force applied by spring 360, the sloped teeth surfaces 378 and 380 enable the thrust ring teeth to slide axially rearward and around nut teeth 374 into the adjacent gaps 372. The body continues to rotate until thrust ring teeth surfaces 380 engage the next set of nut teeth surfaces 378. If the operator continues to actuate the drill motor, the rotational force will again overcome the axial force of spring 360, and teeth 374 and 368 will again ride over each other. This provides a repeating impact that further tightens the nut onto the jaws and that produces a sound to notify the operator that the chuck is in the fully closed position.

It should be understood that the angle formed between sloped side surfaces 378 and 380 and a plane coinciding with chuck axis 331 may vary and that such variance will affect the force imparted between the thrust ring and the nut. For example, if the above described angle is small, a greater force is required between thrust ring 362 and nut 314 to move the thrust ring axially rearward against spring 360 than would be required if the angle were larger.

In a normal operating mode, the front sleeve is rotated with respect to rear sleeve 320 so that thrust ring splines 366 engage shallow recesses 356. In this configuration, thrust ring teeth 368 are held axially out of engagement with nut teeth 374. Thus, when an operator drives the drill to rotate the chuck body, nut 314 rotates with body 312 without impacting thrust ring 362.

Figure 15:
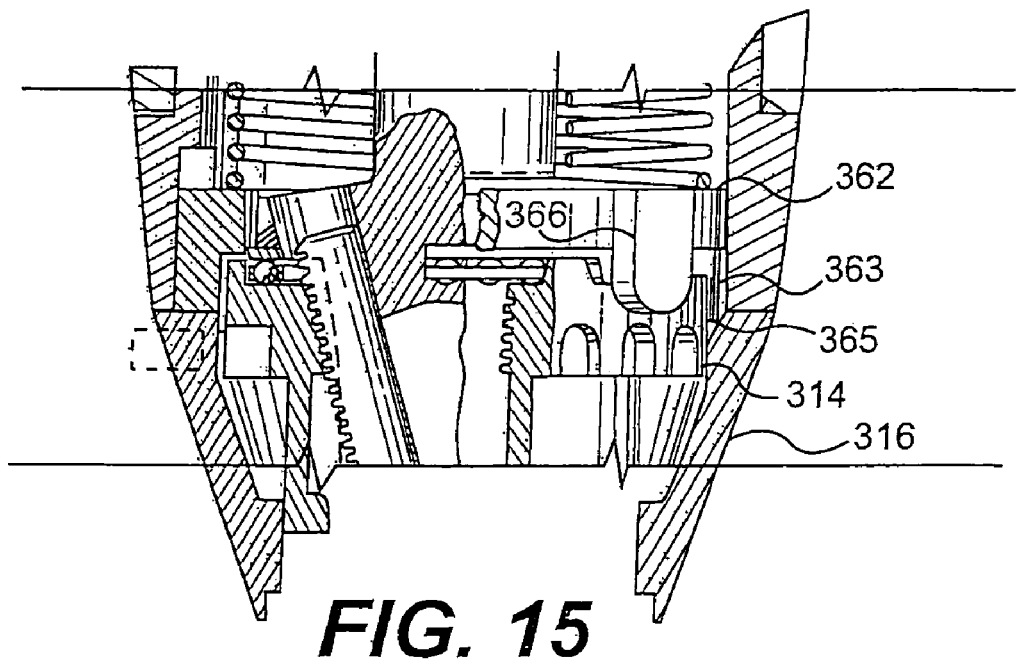
FIG. 15 is a partial sectional view of a chuck and gearbox in accordance with an embodiment of the present invention.

As shown in FIG. 15, thrust ring 362 may include a pin 363 extending axially forward from the thrust ring into an annular recess 365 defined in front sleeve 316. Annular recess 365 extends through an arc of approximately 60 degrees, and pin 363 and annular recess 365 allow the front sleeve to rotate between a first rotational position in which splines 366 are received by deep recesses 358 and a second position in which splines 366 are received by shallow recesses 356. Thus, the sleeve is rotatable between only one impact mode position and only one normal mode position.

As shown in FIGS. 10 and 1A, nut 314 may include a series of gaps 382 in an axially forward facing surface 384 of nut 314 that extend through the nut's circumference. Front sleeve 316 may include a radial hole 386 for receipt of a cylindrical pin 388. An operator can insert an elongated pin 388 through hole 386 and into engagement with a nut gap 382 to rotationally lock nut 314 and sleeve 316. The operator may then rotate the nut with respect to body 312 by holding the nut still with pin 388 while driving the drill motor to rotate body 312 or by gripping flat surfaces 346 to rotationally hold the body while turning the nut with pin 388.

Figure 11B:
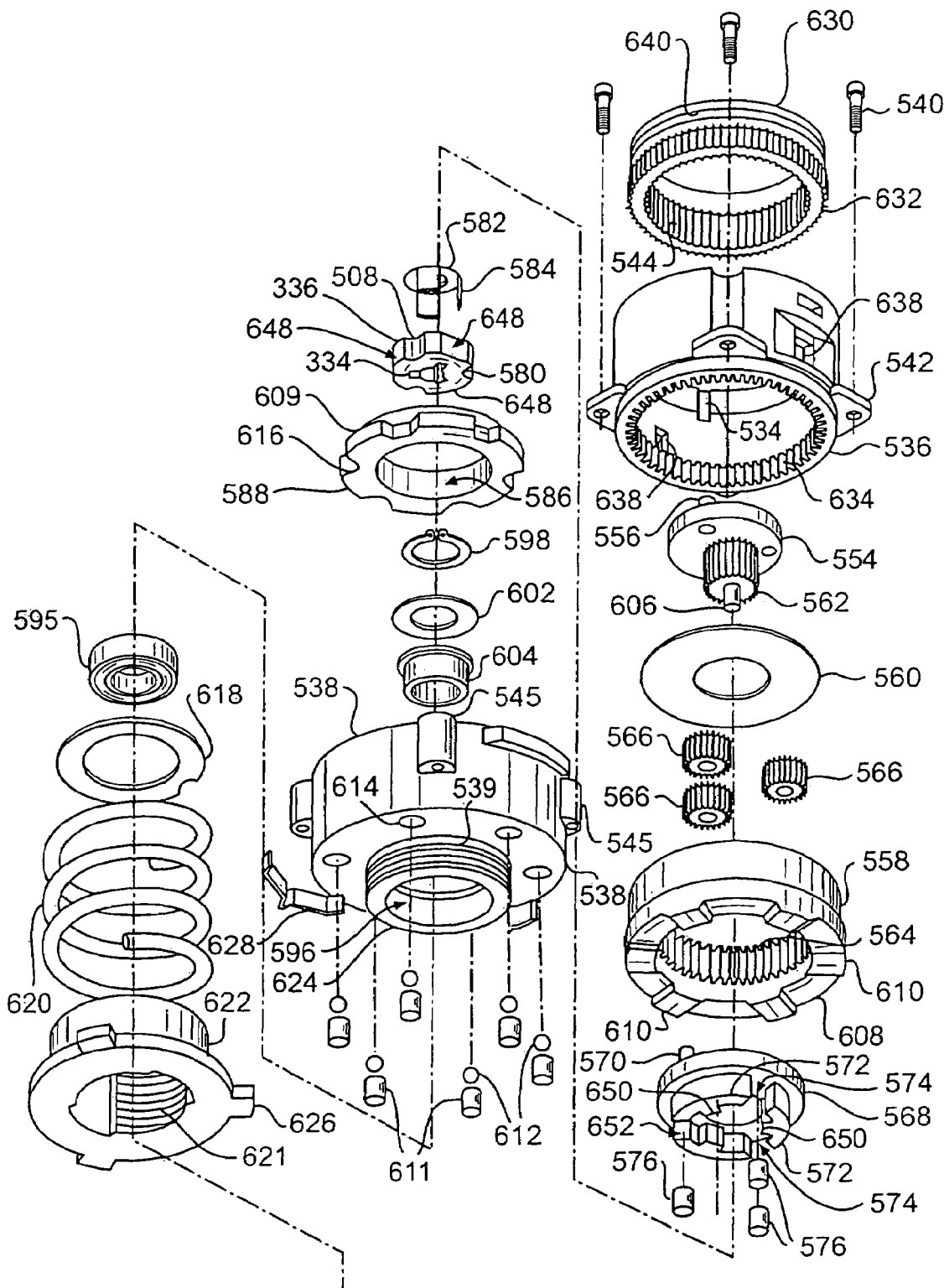
FIG. 11B is a partial exploded view of a chuck and gearbox in accordance with an embodiment of the present invention.
Figure 11C:
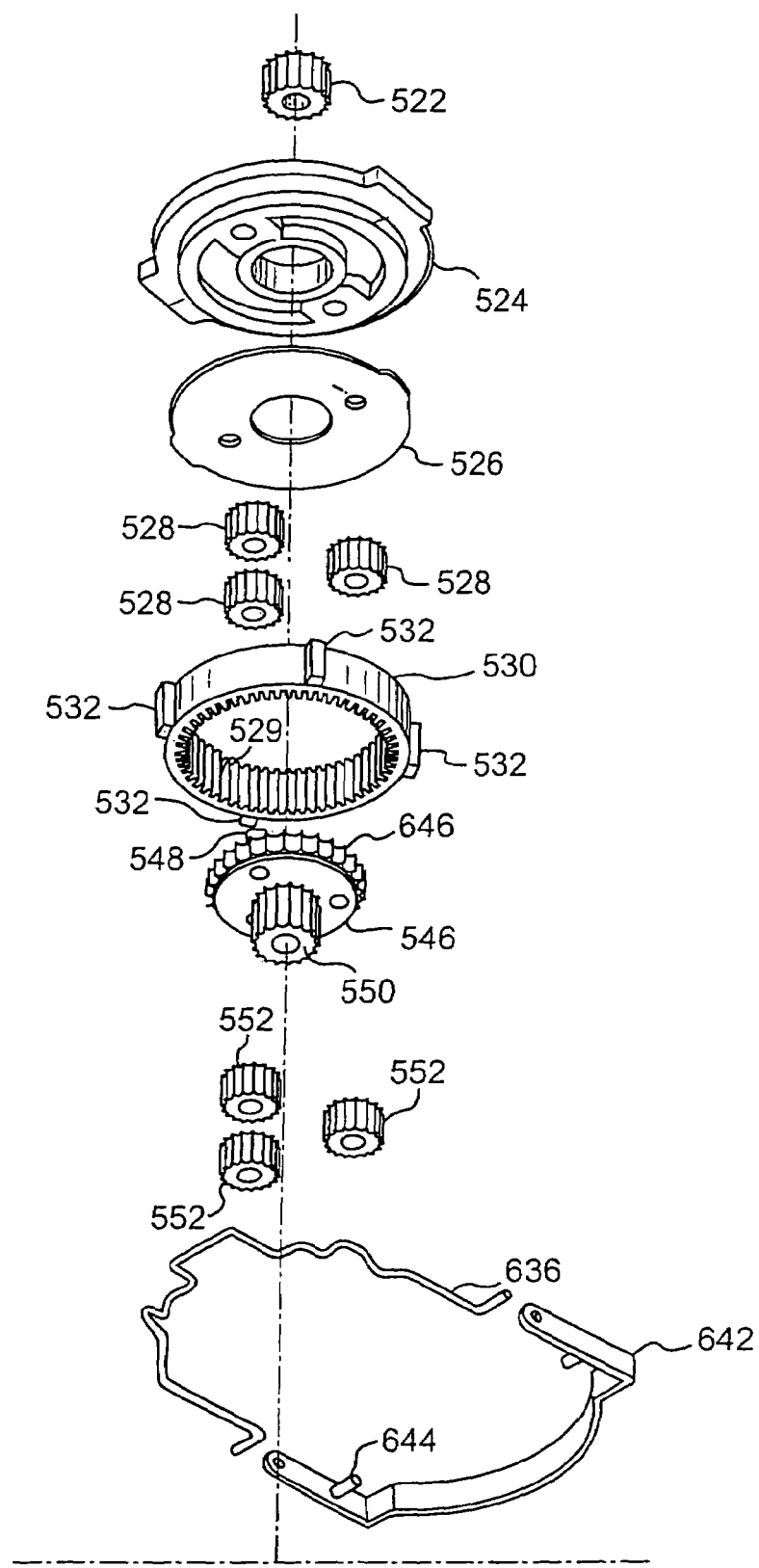
FIG. 11C is a partial exploded view of a chuck and gearbox in accordance with an embodiment of the present invention.
Figure 12:
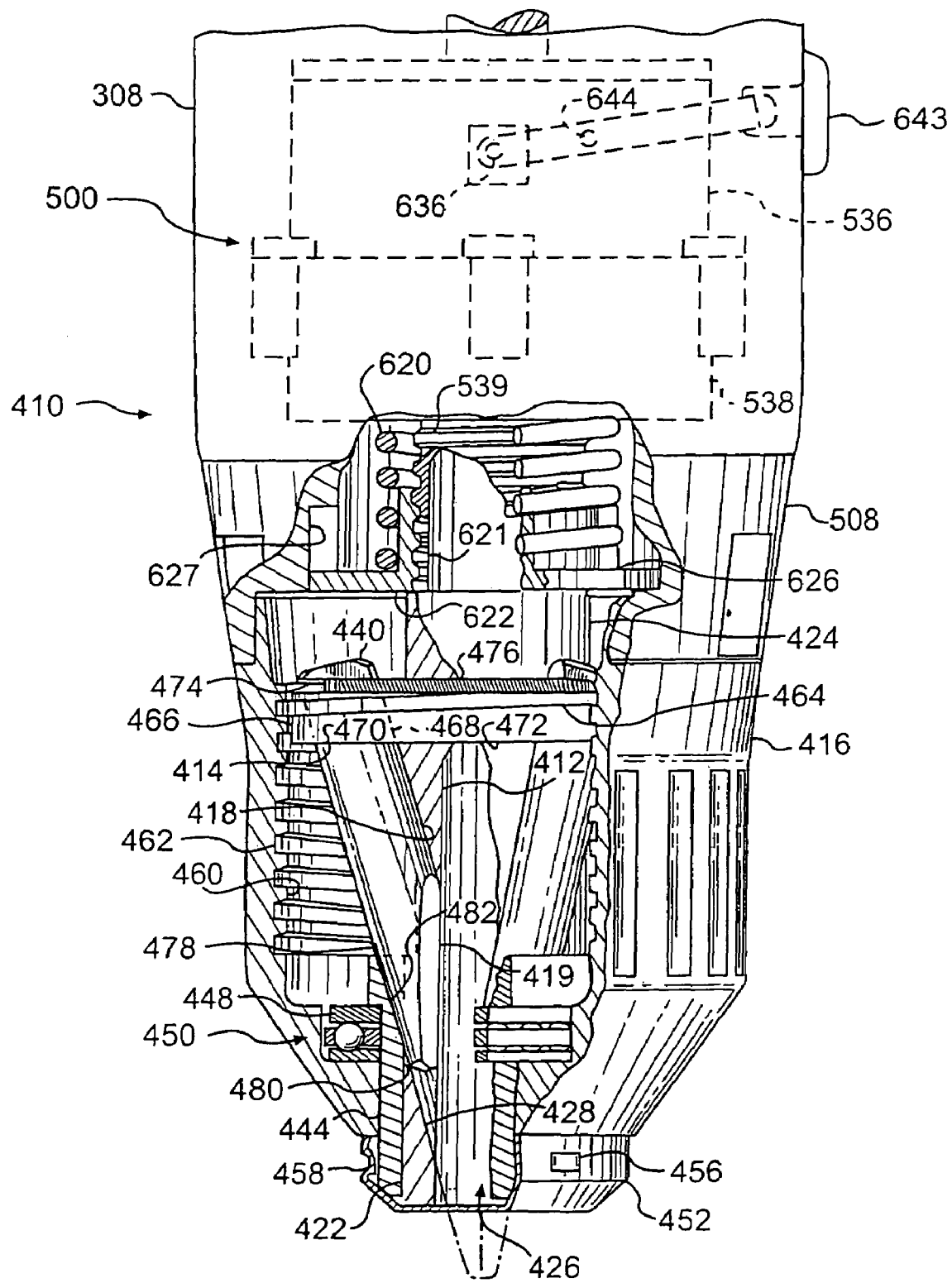
FIG. 12 is a plan view of a chuck and gearbox in accordance with an embodiment of the present invention.

Referring now to FIG. 12, a chuck/gearbox 410 in accordance with another embodiment of the present invention includes a body 412, a nut 414, a sleeve 416, and a plurality of jaws 418. Body 412 includes a nose or forward section 422 and a tail or rearward section 424. Tail section 424, although not fully illustrated beyond the point at which it extends into the gearbox assembly, is configured like tail section 324 in FIGS. 10–11A and can be received by lock cam 336 within the gearbox portion of the drill in like manner. An axial bore 426 is defined in body nose section 422 and includes a plurality of passageways 428 that are angled with respect to the chuck axis and intersect at a common point ahead of the chuck body. As should be understood in this art, body 312 of FIGS. 10–11A and body 412 of FIG. 12 may be formed from steel bar stock or any other suitable material.

Chuck/gearbox 410 includes three jaws separated from each adjacent jaw by an arc of approximately 120 degrees. Each jaw 418 has a tool engaging face 419 generally parallel to the chuck axis and a jaw end section 440 defined at the jaw's opposite end.

A guide ring 444 is pressed onto body forward section 422 and, as discussed in more detail below, maintains alignment of jaws 418 within passageways 428. The guide ring includes a raised portion that defines an axially forward facing ledge 448 that receives a bearing assembly 450. The bearing assembly may comprise any suitable construction, for example as described in U.S. Pat. No. 5,348,318. Bearing assembly 450 transmits rearward axial force from front sleeve 416 to body 412 while permitting relative rotation between the sleeve and the body.

At the forward end of body 412, nose section 422 receives a nosepiece 452 for restraining front sleeve 416 from forward axial movement with respect to the body. Nosepiece 452 includes tabs 456 that are received in an annular groove 458 in guide ring 444 to retain the nosepiece in position. Alternatively, nosepiece 452 may be pressed onto guide ring 444 or attached in any other suitable manner. Furthermore, a snap ring or other suitable mechanism may be used to axially restrain the sleeve. Rearward axial movement of the sleeve on the body is prevented by the guide ring through bearing assembly 450.

The outer circumferential surfaces of sleeves 316 and 416 may be knurled or may be provided with longitudinal ribs or other protrusions to enable the operator to grip them securely. The sleeves may be fabricated from a structural plastic such as polycarbonate, a filled polypropylene, for example glass filled polypropylene, or a blend of structural plastic materials. Other composite materials such as, for example, graphite filled polymerics could also be suitable in certain environments. Further, the sleeves may be constructed from suitable metals, such as steel. As should be appreciated by one skilled in the art, the materials from which the chuck is fabricated will depend on the end use of the power driver, and the above are provided by way of example only.

An interior surface 460 of sleeve 416 defines female threads 462. The threads are a modified square thread formation in an 8-pitch configuration along the length of sleeve 416. It should be understood, however, that any suitable thread shape or formation may be employed, for example including a modified buttress thread.

Nut 414 is axially movably disposed about body 412 and defines a male thread 464 extending about its outer circumferential surface 466. Nut thread 464 has the same pitch as sleeve thread 462 so that when thread 464 is received by thread 462, relative rotation between sleeve 416 and body 412 moves nut 414 axially with respect to the sleeve and the body.

Nut 414 includes three equiangularly spaced apart slots 468 extending axially through the nut and receiving respective end sections 440 of jaws 418 therethrough. Each jaw end section has a generally rectangular cross section that corresponds to the cross section of its slot 468 so that the slot slidably receives the jaw end section but prevents rotation of the jaw about the jaw's axis.

Each jaw end section 440 defines a slot 474 extending generally radially into the end section parallel to shoulders 470 extending from either side of the jaw end sections flush against the nut. Jaw end sections 440 extend through nut slots 468 so that slots 474 are rearward of and parallel to a flat rear face of nut 414. Each slot 474 receives a garter spring 476 so that the jaws are held axially with respect to nut 414 between the garter spring and jaw shoulders 470. The garter spring may comprise a coiled wire spring as illustrated in the Figures, or any other suitable construction, for example an expandable polymer collar.

The jaws are rotationally fixed to the nut by slots 468. Since the jaws prevent the nut from rotating with respect to the body, rotation of sleeve 416 with respect to body 412 moves nut 414 axially with respect to the body by the cooperation between male nut thread 464 and female sleeve thread 462. Depending on the sleeve's rotational direction, the nut moves axially forward or backward on the body and bears either on jaw shoulders 470 or the garter spring to move jaws 418 axially in passageways 428 to an open or closed position.

Garter spring 476 also helps to maintain the jaws in an aligned position in passageways 428. Specifically, as jaws 418 are pushed axially forward toward nose section 422, jaw outer surfaces 478 tend to push against an edge 480 defined at the outer edge of passageways 428. The jaws could pivot on this edge, assuming guide ring 444 were not present, pushing jaw tool engaging surfaces 419 radially inward and end sections 440 radially outward. The garter spring, however, applies a radially inward force rearward of the passageways. This biases the jaws' outer surfaces 478 against the passageways' radially inward facing surfaces and thereby restrains the jaws from pivoting at edges 480. Additionally, guide ring 344 includes a frustoconical inner circumferential surface 482 that extends rearwardly from the passageways 428 to guide the jaws, thereby preventing the jaws from pivoting outward behind edges 480.

It should be understood that any suitable mechanism may be used to retain the jaws axially within the jaw passageways. For example, the garter spring may be replaced by an annular ring rearward of nut 414 that surrounds jaw ends 440. The ring may include three spring arms that extend radially inward and circumferentially from the annular ring. Each arm defines a distal end that is biased radially inward and that is received by a respective slot 474 in a rear jaw end 440. Due to the radially inward bias of the spring arms, the spring arm distal ends maintain contact with the jaw ends as they move radially inward when the jaws move forward to a closed position.

As indicated in FIGS. 10 and 12, it should be understood that various chuck arrangements may be used in conjunction with the present invention and that the particular embodiments illustrated in the figures are provided by way of example only and are not intended to limit the present invention.

As discussed above, the chuck is opened and closed by actuation of a nut, for example by rotation of sleeve 416 (FIG. 12) or nut 314 (FIG. 10) with respect to the body so that a grip, for example comprising jaws 318 as shown in FIG. 10, is moved radially away from or toward the body's axial bore. In chucks having a sleeve that can be manually rotated relative to the body to move the nut, however, rotation of the sleeve also tends to urge rotation of the spindle. Accordingly, a spindle lock may be provided so that the spindle is rotationally fixed to the drill housing when a rotational force other than the motor force is applied to the spindle. Thus, when an operator rotates the sleeve, thereby applying a rotational force to the spindle, the spindle lock rotationally locks the spindle so that the sleeve rotates with respect to the spindle and chuck body.

Various spindle lock arrangements should be understood by those skilled in this art, and it should therefore be understood that any suitable such mechanism is encompassed by the scope of the present invention. FIGS. 11A–11C, however, provide one exemplary spindle lock arrangement within gear assembly 500. Referring to FIG. 11C, the driver motor (not shown) rotationally drives a motor pinion 522 that extends through the central bores of a motor spacer 524 and washer 526 mounted to the motor. Motor pinion 522 extends between and rotationally drives three rear planet gears 528 that engage, and rotate within, a ring gear 530. Ring gear 530 includes splines 532 that are received in grooves 534 (FIG. 11B) of a rear gear housing 536 so that ring gear 530 is rotationally fixed to the rear housing. Rear gear housing 536 is, in turn, secured to a front gear housing 538 by screws 540 that extend through holes in tabs 542 and that are received by holes defined in tabs 545 of the front housing. Thus, the gear housing is rotationally fixed with respect to the motor and the driver housing.

Each rear planet gear 528 is secured to a rear sun gear plate 546 by a respective pin 548 that extends through the planet gear. Thus, when motor pinion 522 rotationally drives rear planet gears 528, the planet gears move about a geared inner circumference 529 of ring gear 530, thereby rotationally driving rear sun gear plate 546. This rotationally drives a pinion 550 extending axially forward from rear sun gear plate 546.

Three middle planet gears 552 are disposed about pinion 550 so that the planet gear teeth interengage with the teeth of pinion 550. Each middle planet gear 552 is attached to a middle sun gear plate 554 (FIG. 11B) by a respective pin 556 that extends through the planet gear. Accordingly, middle sun gear plate 554 rotates with middle planet gears 552 as the planet gears rotate about the pinion axis.

Referring specifically to FIG. 11B, middle sun gear plate 554 is received within a clutch ring gear 558 against a washer 560 so that a pinion 562 extends into ring gear 558 within ring gear teeth 564. Clutch ring gear 558 is an integral part of an adjustable clutch mechanism and is rotationally held to the gear box housing as described below. Three forward planet gears 566 are disposed between pinion 562 and clutch ring gear 558 so that the planet gear teeth interengage with teeth 564 and the teeth of pinion 562. Since clutch ring gear 558 is rotationally held to the gear box housing, rotation of middle sun gear plate 554 and pinion 562 moves front planet gears 566 about the pinion axis.

Each front planet gear 566 is attached to a carrier 568 by a respective pin 570 that extends through the planet gear. Accordingly, the planet gears rotationally drive carrier 568 as the planet gears are driven about the spindle axis by middle sun gear plate 554 and pinion 562.

Carrier 568 includes three axially forward-facing annular segments 572. Three gaps 574 defined between annular segments 572 receive respective lock rollers 576. Lock cam 336 is received within annular segments 572 and is aligned with the annular segments so that flats 648 defined in the outer circumferential surface of the lock cam are radially aligned with gaps 574 in carrier 568. Thus, lock rollers 576 are disposed in gaps 574 between flats 648 and an inner circumferential surface 586 of a lock ring 588 within which carrier 568 and lock cam 336 are received. The lock cam's outer surface also defines grooves 580 that receive dogs 650 extending inward from segments 572. A spacer washer 582 sits between pinion 562 and lock cam 336 and includes three fingers 584 that extend between the lock cam and carrier 568.

As mentioned above, lock cam 336 includes a center bore that defines radially extending slots 334 for receipt of splines 332. Thus, the chuck body is rotationally fixed to the lock cam. Body/spindle 312 is centered in the gearbox housing by a bearing 595 that is received at the forward end of a central bore 596 in front gear housing 538. A C-clamp 598 is received in body tail section groove 600 (FIG. 11A) to secure the spindle in the axially forward direction against a washer 602 and a bushing 604 held within front gear housing 538.

When assembled, spindle end 330 of body/spindle 312 extends into lock cam 336 and carrier 568. A pin 606 extending axially forward from pinion 562 of sun gear plate 554 is received by an axial bore (not shown) defined in a rearward end of body end section 330, thereby centering the sun gear plate.

Clutch ring gear 558 is rotationally held within front gear housing 538 by a clutch mechanism that includes clutch ring 508, a clutch nut 622, a coil spring 620, a washer 618, and pairs of balls 612 and cylinders 611. Clutch nut 622 includes a thread 621 on its inner circumferential surface that engages a thread 539 defined on an extension 624 of front gear housing 538 so that rotational movement of the clutch nut with respect to front gear housing 538 moves clutch nut 622 axially with respect to the front gear housing.

Ring gear 558 includes a forward face 608 that defines axially forward extensions 610 having sloped side surfaces. Forward face 608 extends over carrier 568 and over the rearward section of lock ring 588 so that forward face 608 abuts an inner surface (not shown) of front gear housing 538 through which holes 614 extend. This inner surface defines recesses (not shown) that correspond to splines 609 and gaps 616 in lock ring 588 so that the inner surface of front gear housing 538 receives and rotationally fixes lock ring 588 with respect to the gearbox housing.

Respective pairs of cylinders 611 and balls 612 extend through each hole 614 in front gear housing 538 so that balls 612 abut front face 608 of clutch ring gear 558. Cylinders 611 and balls 612 are held in position by washer 618 pressed against front gear housing 538 by coil spring 620. The coil spring pressure is regulated by clutch nut 622 as it moves axially on front gear housing extension 624. Clutch nut 622 includes radial extensions 626 received in respective grooves 627 (FIG. 10) in clutch ring 508. Thus, rotation of clutch ring 508 moves clutch nut 622 axially forward and backward on front gear housing extension 624 to release and compress spring 620, thereby controlling the pressure by which balls 612 are applied to clutch ring gear front face 608.

The application of balls 612 against the front face of clutch ring gear 558, along with the sloped side surfaces of forward extensions 610, form a clutch that determines the maximum rotational force that body/spindle 312 may apply to a workpiece. As discussed above, body 312 is rotationally driven by carrier 568 that rotationally drives lock cam 336 through drive dogs 650 and lock ring gaps 580. Carrier 568 is, in turn, rotationally driven by front planet gears 566. When pinion 562 rotates, pinion 562 and front planet gears 566 rotate clutch ring gear 558 until the sloped side surfaces of extensions 610 abut balls 612. At this point, balls 612 rotationally hold clutch ring gear 558 with respect to front gear housing 538, and front planet gears 566 begin rotating about the spindle axis along clutch ring gear teeth 564, thereby rotating carrier 568 and body 312. If a tool held in the chuck is engaged with a workpiece so that the spindle's rotation is resisted, this resistance is translated back through spindle section 330 and carrier 568 so that rotation of planet gears 566 about the spindle axis is also resisted. When this resistance reaches a sufficient level, planet gears 566 cease rotation about the spindle axis. Because pinion 562 still drives planet gears 566, however, the planet gears 566 rotate about their respective pins 570. This causes clutch ring gear 558 to rotate with respect to front gear housing 538 so that the sloped side surfaces of extensions 610 push balls 612 and cylinders 611 axially forward against the pressure of washer 618 and coil spring 620. As clutch ring gear 558 rotates with respect to front gear housing 538, a spring 628 is deflected to make a clicking sound to notify the operator that the spindle is no longer rotating. The amount of rotational resistance to the spindle required to activate the clutch is determined by the compression force of spring 620 and the angle of the sloped side surfaces of extensions 610.

The gearbox is constructed so that, for a given rotational speed of motor pinion 522, the spindle may rotate at either of two speeds. As discussed in detail above, carrier 568 rotationally drives integrated spindle body 312, and middle sun gear plate 554 rotationally drives carrier 568 through pinion 562, front planet gears 566 and clutch ring gear 558. On the opposite end, motor pinion 522 rotationally drives rear sun gear plate 546 through rear planet gears 528 and ring gear 530. The transmission of rotational force between rear sun gear plate 546 and middle sun gear plate 554, however, depends upon the axial position of an adjustable ring gear 630.

A shift arm 636 extends about the exterior of rear gear housing 536 so that the ends of the shift arm extend through rear gear housing notches 638 and into an annular groove 640 extending about the rear outer surface of ring gear 630. A pivoting lever arm 642 is disposed about the rear gear box housing 536 and is attached to shift arm 636 so that pivotal movement of the lever arm about pins 644 engaged with the gearbox housing moves adjustable ring gear 630 axially with respect to the spindle. A switch knob 643 is disposed on driver housing 308 in engagement with lever arm 642 so that axial movement of the switch knob with respect to the driver housing causes the lever arm to pivot and move the adjustable ring gear.

In a forward axial position of adjustable ring gear 630, teeth 632 defined about the ring gear's forward outer circumference interengage teeth 634 defined about the inner circumference of rear gear housing 536 so that the adjustable ring gear is rotationally fixed to the rear gear housing. Additionally, teeth 544 defined about the interior of adjustable ring gear 630 interengage with the teeth of middle planet gears 552. Thus, as motor pinion 522 rotationally drives rear sun gear plate 546, pinion 550 drives middle planet gears 552 so that they rotate about the spindle axis along teeth 544 of adjustable ring gear 630, thereby rotationally driving middle sun gear plate 554 and carrier 568.

When lever arm 642 and shift arm 636 move adjustable ring gear 630 rearward to its second axial position, teeth 632 on adjustable ring gear 630 disengage from teeth 634 on rear gear housing 536 so that the adjustable ring gear is rotatable with respect to the rear gear housing. Adjustable ring gear teeth 544 now interengage both with the teeth of middle planet gears 552 and with teeth 646 about the outer circumference of rear sun gear plate 546. Middle planet gears 552 therefore rotate in unison with rear sun gear plate 546. Thus, middle sun gear plate 554 rotates at the same speed as rear sun gear plate 546, thereby causing the chuck's body 312 to rotate at a faster speed.

The transmission of rotational force through the gear assembly operates as described above as long as rotational force is applied by the motor through motor pinion 522. More specifically, the angular width of carrier dogs 650 is slightly less than the width of lock cam gaps 580, and carrier gaps 574 are wider than lock rollers 576. When the motor drives carrier 568, the carrier rotates slightly with respect to the lock cam until dogs 650 engage the sides of grooves 580 and sides 652 of gaps 574 engage the lock rollers. Upon the carrier's further rotation, dogs 650 rotationally drive the lock cam through gaps 580. Gap sides 652 maintain lock rollers 576 in position on lock cam flats 648 as lock cam 336 and carrier 568 rotate within lock ring 588. Gap sides 652 are slightly angled to prevent the rollers from wedging between sides 652 and inner surface 586 of lock ring 588.

If, however, the motor is deactivated and the spindle is rotated, for example referring to the embodiment illustrated in FIG. 12, by rotation of sleeve 416 to open or close the chuck, the spindle rotates lock cam 336 with respect to carrier 568. There is a slight clearance between rollers 576 and lock ring inner surface 586 when the rollers are on flats 648. However, as lock cam 336 rotates in either direction with respect to carrier 568, lock rollers 576 roll up flats 648 and against lock ring inner surface 586, preventing further rotation of the lock cam and, therefore, the spindle.

As discussed above, it should be understood that various suitable spindle lock arrangements may be employed within the scope of the present invention. For example, the spindle lock mechanism may be disposed on either side of the gearing. Thus, while in the embodiment illustrated in the drawings the lock cam is in rotationally driving engagement with the spindle through direct attachment to the spindle, the cam may also drive the spindle through a gearing arrangement. In such an embodiment, the drive plate (carrier 568 in the embodiment illustrated in FIG. 11B) may be directly attached to the motor output.

In another preferred embodiment, the three carrier segments 572 in FIG. 11B are replaced by two segments spaced apart from each other on the carrier face. Each segment defines a gap in which a lock roller is disposed and a space offset approximately 90 degrees from each gap. Lock cam 336 defines two generally circular outer circumferential surfaces within the carrier segments, each including a tab as described below. Flats are defined on opposite sides of the lock cam and are aligned with the lock rollers so that the rollers sit between the flats and inner surface 586 of lock ring 588. Two generally wedge-shaped tabs extend radially outward from opposite sides of the lock cam surface and have angled sides generally radially aligned with the lock cam. The tabs are offset approximately 90 degrees from the flats and extend into the spaces between the carrier segments.

The angular width of the tabs is slightly less than the width of the space in the carrier segments, and the carrier gaps are wider than the rollers. When the motor drives carrier 568 (FIG. 11B), the carrier rotates slightly with respect to the lock cam until the carrier segments, or dogs, engage the lock cam tabs. The carrier gap sides engage the lock rollers. Upon the carrier's further rotation, the carrier rotationally drives the lock cam through the tabs, and the gap sides maintain the lock rollers in position on the flats as the lock cam and carrier rotate within the lock ring. The sides of the carrier gaps are slightly angled to prevent the rollers from wedging between the sides and lock ring inner surface 586.

If, however, the motor is deactivated, and the spindle is rotated from its distal end, the spindle rotates the lock cam with respect to the carrier. There is a slight clearance between the lock rollers and the lock ring inner surface when the rollers are on the flats. As the lock cam rotates in either direction, however, the rollers roll up the flats and against the lock ring inner surface, preventing further rotation of the lock cam and the spindle with respect to the lock ring and the housing.

In addition, externally-actuated and ratchet-type spindle lock mechanisms may be used in conjunction with or in place of the cam-type spindle locks discussed above. For example, where lock rollers 576, lock ring 588, and lock cam 336 are omitted, and carrier 568 directly drives the spindle through a splined interface, a pin may be provided that extends through the drill housing adjacent the spindle. A spring set in the housing biases the pin away from the spindle, which includes a keyway adjacent the pin's interior end. When the keyway aligns with the pin, and an operator depresses the pin, the keyway receives the pin to prevent the spindle's further rotation. Actuation of the pin may also disconnect the motor from its power source to prevent the motor's actuation while the spindle is locked. Furthermore, the pin may directly engage the spindle or may engage the gearing assembly to prevent the spindle's rotation. As should be understood by those of ordinary skill in the art, other ratchet and non-ratchet-type spindle locks may be used.

Figure 13:
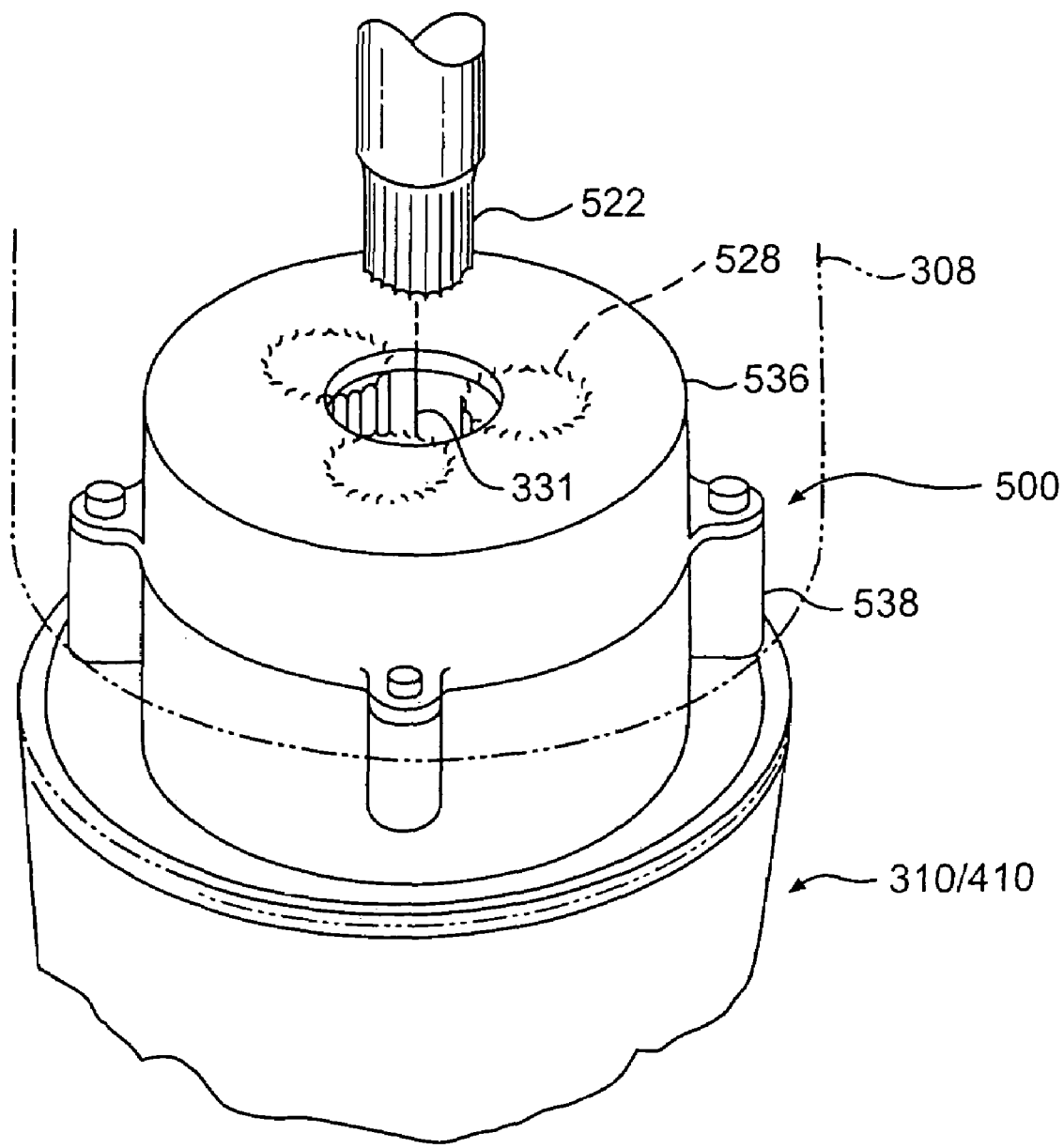
FIG. 13 is a partial exploded perspective view of a driver motor shaft and a chuck and gearbox assembly in a driver in accordance with an embodiment of the present invention.

When assembled as shown in FIG. 10, the chuck and gearbox form a package that may be easily installed into the drill or other power driver. The drill housing may be formed in two halves so that the motor and the chuck/gearbox package may be placed together in the first half and so that the second half may then be attached to the first half to hold the motor and the package together. As shown in FIG. 13, rear planet gears 528 are disposed at the rearward end of rear gear housing 536 about chuck axis 331. Before assembling drill housing 308, the chuck/gearbox package is brought to the motor so that motor pinion 522 is received within gearbox housing 500 in engagement with the rear planet gears. The second half of the drill housing is then attached to the first half so that an annular ridge about the rear end of ring 508 (FIG. 10) is received within an annular groove about the inner circumference of a forward end of the drill housing, thereby retaining the package in position with respect to the motor and the drill housing.

Figure 14:
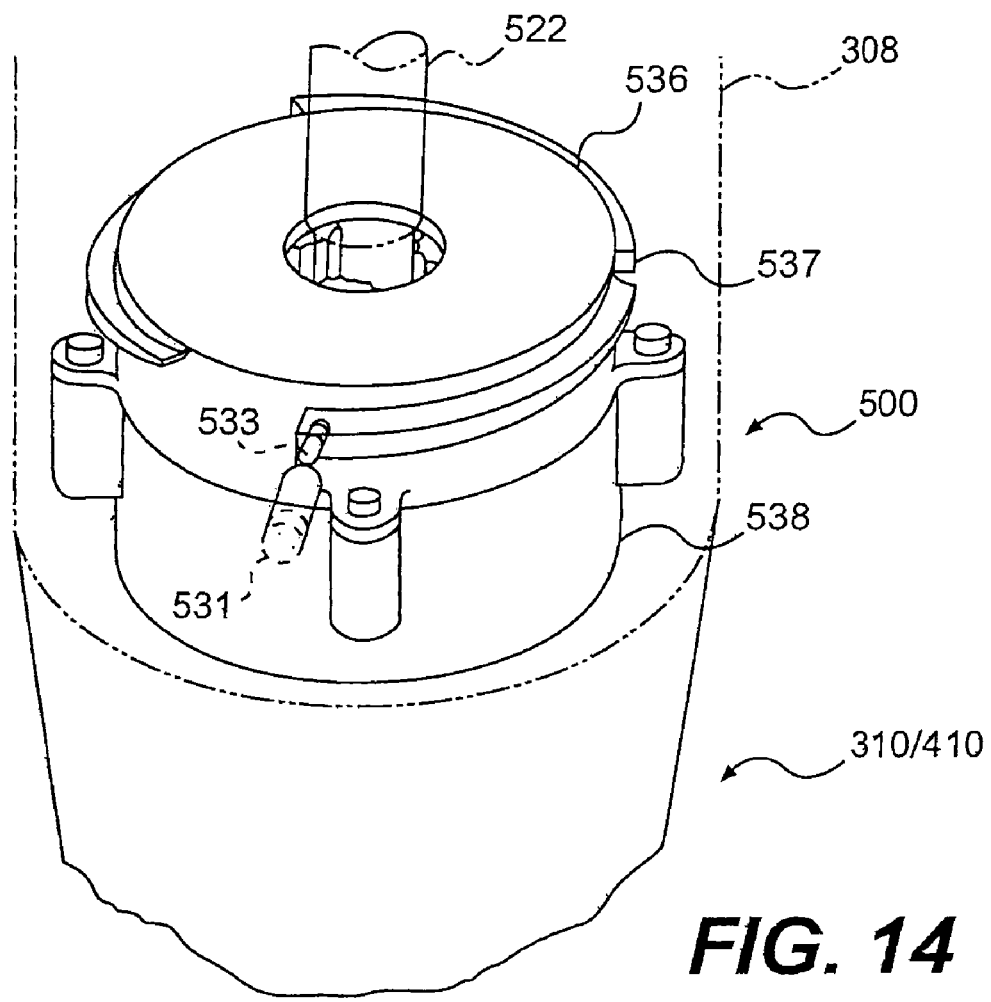
FIG. 14 is a partial perspective view of a driver in accordance with an embodiment of the present invention.

The chuck/gearbox package may be installed in a variety of power drivers and in any suitable manner. As shown in FIG. 14, for example, rear gearbox housing member 536 may include a thread 537 defined about its outer circumferential surface. Power driver housing 308 defines a female thread (not shown) about an inner circumferential surface of its forward end. To install the package into the housing, the gearbox end of the package is inserted into the housing's front opening until thread 537 engages the housing's female thread. A quarter turn of the package then runs the threads into each other to axially hold the package within the housing. This arrangement allows installation and removal of the chuck/gearbox package without disassembly of the power driver housing, thereby permitting effective exchange of chuck and gearing configurations within a single driver.

A pin 533 is disposed within thread 537 at a back end of the thread. A spring in the gearbox housing biases pin 533 radially outward so that once the gear housing is fully threaded into the drill housing, pin 533 moves radially outward into a hole defined within the drill housing thread.

Thus, pin 533 retains gearbox assembly 500 in its threaded engagement with driver housing 308.

To permit removal of the chuck/gearbox package, housing 308 includes a mechanism to disengage pin 533 from the hole in the housing. An actuating pin 531 is reciprocally disposed in the hole and extends outward from the housing so that it may be pushed by an operator. Actuation of pin 531 depresses pin 533 so that pin 533 is removed from the hole to enable the operator to unthread the gearbox assembly from the housing. Pin 531 may be configured within the driver housing so that a spring seated within the hole biases the pin radially outward. The outer opening of the hole may be peened to retain the pin. When engaged, pin 533 extends into the hole within the spring.

While one or more preferred embodiments have been described above, it should be understood that any and all equivalent realizations of the present invention are included within the scope and spirit thereof. The embodiments depicted are presented by way of example only and are not intended as limitations on the present invention. Thus, it should be understood by those of ordinary skill in this art that the present invention is not limited to these embodiments since modifications can be made. Therefore, it is contemplated that any and all such embodiments are included in the present invention as may fall within the scope and spirit of the appended claims.

What is claimed is:

1. A power driver with a geared tool holder, said power driver comprising:
    (a) a power driver motor having an output shaft;
    (b) a power driver housing that defines a chamber in which said output shaft is disposed;
    (c) an assembled geared tool holder that includes
        a generally cylindrical chuck body having a nose section and a tail section opposite said nose section, wherein said nose section has an axial bore formed therein and wherein said axial bore is configured to receive a tool therein,
        a plurality of jaws disposed within said chuck body and movable toward and away from said axial bore,
        a planetary gear assembly disposed operatively about an axis of, and in driving communication with, said tail section so that a plurality of input planetary gears of said planetary gear assembly are each simultaneously rotatable about a respective gear axis in driving engagement with each other to rotationally drive said chuck body about said axis of said tail section when said jaws grip said tool received within said axial bore, and
        a tool holder housing, at least a portion of which is shaped matingly with respect to at least a portion of said chamber; and
    (d) wherein said output shaft is directly received in driving engagement with said input planetary gears and so that said at least a portion of said tool holder housing is matingly received by said chamber to axially retain said assembled geared tool holder within said power driver housing.

2. The power driver of claim 1, wherein
    said tool holder housing defines an annular flange about an outer surface of said tool holder housing,
    said power driver is formed of a pair of clamshell halves,
    said chamber defines an annular groove, and
    said assembled geared tool holder is disposed with respect to said power driver motor so that said output shaft is received by said input planetary gears, and
    said pair of clamshell halves enclose said power driver motor and said geared tool holder so that said annular flange is received in said annular groove.

3. The power driver of claim 1, wherein
    said tool holder housing defines a first thread about an outer surface of said tool holder housing,
    said power driver housing defines a second thread within said chamber, and
    said geared tool holder is received in said chamber such that said first and second threads engage each other.

4. The power driver of claim 1, wherein
    said nose section includes a plurality of angularly disposed passageways formed in said nose section and intersecting said axial bore,
    a separate one of said jaws is slidably positioned in a respective one of said passageways, each of said jaws having a jaw face formed on one side thereof, and
    said geared tool holder includes a nut axially movably disposed about said chuck body in driving engagement with said jaws so that axial movement of said nut with respect to said chuck body moves said jaws in said passageways.

5. The power driver of claim 4, wherein said geared tool holder includes a generally cylindrical sleeve rotatably mounted about said chuck body and defining a threaded inner circumferential surface, wherein said nut defines a threaded outer circumferential surface, and wherein said threaded inner circumferential surface of said sleeve engages said threaded outer circumferential surface of said nut so that rotation of said sleeve drives said nut axially with respect to said chuck body.

6. The power driver of claim 1, wherein
    said nose section includes a plurality of angularly disposed passageways formed in said nose section and intersecting said axial bore,
    a separate one of said jaws is slidably positioned in a respective one of said passageways, each of said jaws having a jaw face formed on one side thereof and threads formed on an opposite side thereof, and
    said geared tool holder includes a nut that is rotatably mounted relative to said chuck body and that has threads engaging said threads on said jaws so that rotation of said nut relative to said chuck body moves said jaws axially in said passageways.

7. A power driver with a geared tool holder for holding a tool, said power driver comprising:
    (a) a power driver motor having an output shaft;
    (b) a power driver housing that defines a chamber in which said output shaft is disposed and that defines a first thread;
    (c) an assembled geared tool holder that includes
        a generally cylindrical chuck body having a nose section and a tail section opposite said nose section, wherein said nose section has an axial bore formed therein and wherein said axial bore is configured to receive the tool therein,
        a gear assembly disposed operatively about an axis of, and in driving communication with, said tail section so that said gear assembly rotationally drives said chuck body about said axis, and
        a tool holder housing that defines a second thread about a surface thereof; and
    (d) wherein said assembled geared tool holder is received in said chamber so that said output shaft is received in driving engagement with said gear assembly and said first and second threads engage each other.

8. The power driver of claim 7, wherein said tool holder housing includes a generally cylindrical gear box housing surrounding said gear assembly, and wherein said gear box housing defines said second thread about an outer surface thereof.

9. A power driver with a geared tool holder, said power driver comprising:
   (a) a power driver motor having an output shaft;
   (b) a power driver housing that defines a chamber in which said output shaft is disposed;
   (c) an assembled geared tool holder that includes
      a generally cylindrical chuck body having a nose section and a tail section opposite said nose section, wherein said nose section has an axial bore formed therein and wherein said axial bore is configured to receive a tool therein,
      a gear assembly disposed operatively about an axis of, and in driving communication with, said tail section so that said gear assembly rotationally drives said chuck body about said axis, and
      a tool holder housing, wherein at least a portion of said tool holder housing is shaped matingly with respect to at least a portion of said chamber, wherein said tool holder housing includes a generally cylindrical gear box portion enclosing said gear assembly, and wherein said generally cylindrical gear box portion has a generally planar rear surface that defines an opening to said gear assembly; and
   (d) wherein said output shaft is received through said opening of said generally planar rear surface and is in driving engagement with said gear assembly, and said at least a portion of said tool holder housing is matingly received by said chamber to axially retain said assembled geared tool holder within said power driver housing.

10. The power driver of claim 9, wherein said tool holder housing defines an annular flange about an outer surface of said tool holder housing, said power driver is formed in a pair of clamshell halves, said chamber defines an annular groove, and said geared tool holder is disposed with respect to said power driver motor so that said output shaft is received by said gear assembly, and said pair of clamshell halves enclose said power driver motor and said geared tool holder so that said annular flange is received in said annular groove.

11. The power driver of claim 9, wherein said tool holder housing defines a first thread about an outer surface of said tool holder housing, said power driver housing defines a second thread within said chamber, and said geared tool holder is inserted into said chamber and said first and second threads engage each other.

* * * * *

UNITED STATES PATENT AND TRADEMARK OFFICE
CERTIFICATE OF CORRECTION

PATENT NO. : 7,008,151 B2 Page 1 of 1
APPLICATION NO. : 10/837970
DATED : March 7, 2006
INVENTOR(S) : Theodore G. Yaksich et al.

It is certified that error appears in the above-identified patent and that said Letters Patent is hereby corrected as shown below:

In the specification
Column 3, line 35, after "120", please delete the symbol "[]" and replace with --degrees--.
Column 4, line 26, after "5", please delete the symbol "[] and replace with --degrees--.
Column 4, line 44, after "90", please delete the symbol "[]" and replace with --degrees--.
Column 12, line 17, after "FIG.", please delete "1A" and replace with --11A --.
Column 13, line 49, after the word "and", please delete "1A" and replace with --11A--.

Signed and Sealed this

Twenty-eighth Day of November, 2006

JON W. DUDAS
*Director of the United States Patent and Trademark Office*